United States Patent
Otani et al.

[11] Patent Number: 5,774,266
[45] Date of Patent: Jun. 30, 1998

[54] IMAGE STABILIZING DEVICE

[75] Inventors: Tadasu Otani, Kanagawa-ken; Koichi Washisu, Tokyo, both of Japan

[73] Assignee: Canon Kabushiki Kaisha, Tokyo, Japan

[21] Appl. No.: 446,558

[22] Filed: May 19, 1995

Related U.S. Application Data

[63] Continuation of Ser. No. 41,454, Apr. 2, 1993, abandoned.

[30] Foreign Application Priority Data

| Apr. 6, 1992 | [JP] | Japan | 4-112439 |
| Apr. 20, 1992 | [JP] | Japan | 4-125369 |

[51] Int. Cl.⁶ .................................................. G02B 27/64
[52] U.S. Cl. .......................... 359/554; 359/555; 359/813; 354/70
[58] Field of Search ................................... 359/554, 555, 359/556, 557, 811, 813, 815, 189; 354/70

[56] References Cited

U.S. PATENT DOCUMENTS

| 3,824,000 | 7/1974 | Burns | 359/811 |
| 4,013,339 | 3/1977 | Ando et al. | 354/70 |
| 4,780,739 | 10/1988 | Kawauami et al. | 354/70 |
| 4,869,108 | 9/1989 | Washisu | 73/517 B |
| 4,965,619 | 10/1990 | Shikaumi et al. | 354/410 |
| 4,974,950 | 12/1990 | Yamazaki et al. | 359/557 |
| 5,020,369 | 6/1991 | Washisu et al. | 73/517 A |
| 5,140,462 | 8/1992 | Kitagishi | 359/554 |
| 5,153,633 | 10/1992 | Otani | 354/70 |
| 5,181,056 | 1/1993 | Noguchi et al. | 354/70 |
| 5,182,671 | 1/1993 | Kitagishi et al. | 359/554 |
| 5,231,445 | 7/1993 | Onuki et al. | 354/70 |
| 5,237,363 | 8/1993 | Okada et al. | 354/70 |
| 5,266,988 | 11/1993 | Washisu | 354/70 |
| 5,416,558 | 5/1995 | Katayama et al. | 354/70 |

*Primary Examiner*—Tan T. Nguyen
*Attorney, Agent, or Firm*—Fitzpatrick, Cella, Harper & Scinto

[57] ABSTRACT

The present invention relates to a deflecting device for deflecting a flux of passing light rays by causing an optical member to move in a plane perpendicular to or approximately perpendicular to the optical axis of an optical system, such as a photographic optical system, in parallel with the plane and making the optical axis of the movable optical member eccentric with respect to the optical axis of the optical system, or to an optical apparatus, such as an image-shake correcting device, for correcting an image shake by the deflection of a pencil of passing light rays. In such a device, there is provided an adjusting mechanism, such as an eccentric shaft or mechanism for supporting the optical members at a plurality of supporting points, for adjusting an inclination of the optical axis of the movable optical member with respect to the optical axis of the optical system to make both the optical axes parallel to each other. According to the above-described arrangement, it is possible to maintain the optical performance of the device or the apparatus at a high level without increasing the precision of constituent elements of mechanism for supporting the movable optical member.

48 Claims, 21 Drawing Sheets

IMAGE STABILIZING DEVICE

This application is a continuation of prior application Ser. No. 08/041,454 filed on Apr. 2, 1993, now abandoned.

BACKGROUND OF THE INVENTION

1. Field of the Invention

The present invention relates to an image stabilizing device suitable for use in an optical apparatus such as a camera or a video camera and, more particularly, to an image stabilizing device having image-shake correcting optical means for performing image-shake correction by deflecting a flux of passing light rays.

2. Description of the Related Art

Related arts which pertain to the present invention will be described below.

In present-day cameras, all operations which are important for photography, such as exposure control and focusing, are automated so that even a person who is not skilled in camera operation s seldom fails to take a photograph. However, it is still difficult to automatically prevent a photography failure due to a camera shake.

Researches into a camera capable of automatically preventing a photography failure due to the camera shake have been carried out. In particular, intensive research and development have recently been directed toward a camera capable of automatically preventing a photography failure due to a camera shake caused by a photographer.

For example, a camera shake which occurs during photography is a vibration which normally has a frequency range of 1 Hz to over 10 Hz, and it is desirable that, even if such a camera shake occurs, a photographer can confirm whether there is no image shake at the instant when he aims at a subject through the viewfinder of a camera and can also take a photograph free from an image shake at the time when the shutter of the camera is released. As a basic concept for realizing such an operation, it is necessary to provide an art for detecting the shake of the camera and displacing a correcting lens in accordance with the value of the detected camera shake.

To achieve this object, i.e., to provide an art for making it possible to effect photography free from an image shake even if a camera shake occurs, it is first necessary to detect the camera shake. In principle, the detection of the camera shake can be realized by providing a camera with a vibration sensor for detecting an angular acceleration, an angular velocity or the like and a camera-shake detecting system for electrically or mechanically integrating the output signal of the vibration sensor and outputting an angular displacement. On the basis of the detection information, a correcting optical mechanism including, as optical correcting means, a correcting lens for making eccentric or inclining a photographic optical axis is driven to effect image-shake correction.

The essential arrangement of an image-shake correcting system for a camera using an angular accelerometer will be described with reference to FIG. 13.

The example shown in FIG. 13 is arranged to correct an image shake which derives from a camera pitch $1p$ and a camera yaw $1y$ as indicated by curved double-headed arrows denoted generally at 1. The shown example includes a lens barrel 2, angular accelerometers $3p$ and $3y$ for respectively detecting an angular acceleration of the camera pitch $1p$ and an angular acceleration of the camera yaw $1y$, the directions of detection of the respective angular accelerations being indicated by $4p$ and $4y$, and integrators $5p$ and $5y$ which utilize known analog integrating circuits, respectively. The integrators $5p$ and $5y$ integrate angular acceleration signals inputted from the respective angular accelerometers $3p$ and $3y$, thereby converting the angular acceleration signals into camera-shake angular displacement signals. In accordance with the camera-shake angular displacement signals, a correcting optical mechanism 6 (including driving parts $7p$ and $7y$ and correcting optical position sensors $8p$ and $8y$) is driven in the directions of the camera pitch $1p$ and the camera yaw $1y$ in a plane perpendicular to an optical axis of a photographic optical system (not shown), thereby making the photographic optical axis eccentric to ensure image stabilization in an image plane 9 so that an image-shake correcting effect is achieved.

A correcting optical mechanism suitable for use as such an optical correcting means will be described below with reference to FIG. 14.

In the correcting optical mechanism shown in FIG. 14, a correcting lens 101 is drivable in two directions (a pitch direction $102p$ and a yaw direction $102y$) which are perpendicular to each other and intersect an optical axis $101a$ at right angles. The arrangement of the correcting optical mechanism will be described below.

A fixing frame 103 which holds the correcting lens 101 is slidable along a pitch slide shaft $105p$ by means of slide bearings $104p$, and the pitch slide shaft $105p$ is fitted through a first holding frame 106.

A shaft $130p$ is fitted through the fixing frame 103 into engagement with an engagement groove $106a$ formed in the first holding frame 106. The shaft $130p$ serves as a rotation stopper which allows the fixing frame 103 to slide along the pitch slide shaft $105p$ in a plane perpendicular to the optical axis $101a$ without rotating about the pitch slide shaft $105p$.

A pitch coil $108p$ is attached to the fixing frame 103. The pitch coil $108p$ is placed in a magnetic circuit formed by a pitch magnet $109p$ and a pitch yoke $101p$, and the fixing frame 103 is driven in the pitch direction $102p$ by causing an electric current to flow through the pitch coil $108p$. The fixing frame 103 is also provided with a slit $111p$ and a light emitter (infrared emission diode) $112p$, and the slit $111p$ and the light emitter $112p$ cooperate with a light receiver (semiconductor position-sensitive detector PSD) $113p$ provided on a housing 114 in performing detection of a position of the fixing frame 103 with respect to the pitch direction $102p$.

The housing 114 is integral with a lens barrel (not shown in FIG. 14), and is arranged in a plane perpendicular to the photographic optical axis.

Slide bearings $104y$ are fitted in the first holding frame 106, whereby the first holding frame 106 is made slidable along a yaw slide shaft $105y$. The yaw slide shaft $105y$ is fixed to the housing 114. Since the housing 114 is integral with the lens barrel, the first holding frame 106 is movable in the yaw direction $102y$ with respect to the lens barrel.

A yaw coil $108y$ is attached to the fixing frame 103. The yaw coil $108y$ is placed in a magnetic circuit formed by a yaw magnet $109y$ and a yaw yoke $110y$, and the fixing frame 103 is driven in the yaw direction $102y$ by causing an electric current to flow through the yaw coil $108y$.

A shaft $130y$ is fitted to the housing 114 by means of a fixing member 131 and is engaged with an engagement groove $106b$ formed in the first holding frame 106. The shaft $130y$ has a function similar to that of the above-described shaft $130p$, that is, while the first holding frame 106 is sliding along the yaw slide shaft $105y$, the shaft $130y$ serves as a rotation stopper which allows the fixing frame 103 secured to the first holding frame 106 by means of the pitch slide shaft 105p to slide in the plane perpendicular to the optical axis 101a without rotating about the yaw slide shaft 105y.

The fixing frame 103 is also provided with a slit 111y and a light emitter (infrared emission diode) 112y and, as in the case of position detection relative to the pitch direction 102p, the slit 111y and the light emitter 112y cooperate with a light receiver (semiconductor position-sensitive detector PSD) 113y provided on the housing 114 in performing detection of a position of the fixing frame 103 with respect to the yaw direction 102y.

As described above, the eccentrically movable part of the correcting optical mechanism includes the fixing frame 103 containing the correcting lens 101, the slits 111p and 111y, the light emitters 112p and 112y and the coils 108p and 108y, and moves integrally with the correcting lens 101.

The operation of driving the correcting lens 101 in the pitch direction 102p and the yaw direction 102y is executed by amplifying the outputs of the respective light receivers 113p and 113y through amplifiers 115p and 115y and inputting the amplified signals to the respective coils 108p and 108y to drive the fixing frame 103. The outputs of the respective light receivers 113p and 113y vary correspondingly. If the driving directions (polarities) of the respective coils 108p and 108y are set in the directions in which the outputs of the respective light receivers 113p and 113y become smaller, closed systems which are respectively indicated by solid lines 118p and 118y stabilize at the points where the outputs of the respective light receivers 113p and 113y are nearly zero.

Compensating circuits 116p and 116y are circuits for stabilizing the corresponding closed systems to a further extent. Adder circuits 120p and 120y are circuits for adding the outputs of the respective amplifiers 115p and 115y to instruction signals 119p and 119y inputted to the respective adder circuits 120p and 120y. Driving circuits 117p and 117y are circuits for supplying electric currents to be applied to the respective coils 108p and 108y.

The image stabilizing system of FIG. 13 is arranged in the above-described manner.

When the instruction signals 119p and 119y for image-shake correction are externally applied to the image stabilizing system, the correcting lens 101 is extremely accurately driven in accordance with the instruction signals in the pitch direction 102p and the yaw direction 102y, whereby an image-shake correcting effect in the image plane 9 can be realized.

FIG. 15 shows in more detail the above-described driving means for driving the correcting optical mechanism. The following description refers to only the driving means associated with the pitch direction 102p.

Current-voltage conversion amplifiers 121a and 121b convert photoelectric currents produced in the light receiver 113p (including resistors R1 and R2) by the light emitter 112p into corresponding voltages, and a differential amplifier 122 finds the difference between the voltages outputted from the current-voltage conversion amplifiers 121a and 121b. The difference signal indicates the position of the correcting lens 101 with respect to the pitch direction 102p. The current-voltage conversion amplifiers 121a and 121b and the differential amplifier 122 as well as resistors R3 to R10 constitute the amplifier 115p of FIG. 14.

An amplifier 123 adds an instruction signal 219p to the difference signal outputted from the differential amplifier 122, and constitutes the adder circuit 120p of FIG. 14 together with resistors R11 to R14. Resistors R15 and R16 and a capacitor C1 constitute a known phase advancing circuit, which corresponds to the compensating circuit 116p of FIG. 14 and stabilizes the closed system.

The output of the adder circuit 120p is inputted to a driving amplifier 124 via the compensating circuit 116p, in which a driving signal for the pitch coil 108p is generated, and the correcting lens 101 is displaced by application of the driving signal to the pitch coil 108p. The driving amplifier 124, the resistor R17 and transistors TR1 and TR2 constitute the driving circuit 117p of FIG. 14.

An adder amplifier 125 finds the sum of the outputs of the current-voltage conversion amplifiers 121a and 121b (i.e., the total amount of light received by the light receiver 113p). A driving amplifier 126 receives the sum signal and drives the light emitter 112p in accordance with the received sum signal. The adder amplifier 125, the driving amplifier 126, resistors R18 to R22 and a capacitor C2 constitute a driving circuit (not shown in FIG. 14) for the light emitter 112p.

The amount of light emitted from the light emitter 112p extremely unstably varies with temperature or the like and the position sensitivity of the differential amplifier 122 varies correspondingly. However, if the light emitter 112p is controlled by the above-described driving circuit so that the total amount of received light is made constant in the above-described manner, the variation of the position sensitivity is prevented.

FIGS. 16 through 19 show one arrangement example of an angular displacement detecting device which serves as the above-described vibration sensor. The angular displacement detecting device will be described below with reference to these figures.

The angular displacement detecting device shown in FIGS. 16 through 19 includes a base plate 301 to which various parts constituting the device are secured in position, and a cylindrical container 302 having a chamber in which are enclosed a floating element 303 and a liquid 304 which will be described later. The floating element 303 is held rotatably about an axis 303a by a floating-element holder 305 and has a projection 303b on which a slit-shaped reflecting surface is formed. Also, the floating element 303 is made of a permanent-magnet material and is magnetized in a direction parallel to the axis 303a. The floating element 303 is arranged in such a manner as to maintain the balance of rotation about the axis 303a and the balance of buoyancy in the liquid 304.

The angular displacement detecting device shown in FIGS. 16 through 19 also includes the floating-element holder 305 which is fixed to the cylindrical container 302 in the state of holding the floating element 303 by means of pivot bearings 306, a U-shaped yoke 307 which is attached to the base plate 301 and forms a closed magnetic path in cooperation with the floating element 303, a wound coil 314 which is disposed between the floating element 303 and the yoke 307 in fixed relation to the cylindrical container 302, a light emitter (iRED) 308 which is energized to emit light and which is attached to the base plate 301, and a light receiver (PSD) 309 the output of which varies in accordance with the position in which light is received and which is attached to the base plate 301. The light emitter 308 and the light receiver 309 constitute optical angular displacement detecting means of the type in which light is transmitted via the projection (reflecting surface) 303b.

A mask 310 is disposed in front of the light emitter 308, and has a slit 310a through which light is transmitted. A stopper member 311 is attached to the cylindrical container 302 to limit the rotation of the floating element 303 so that the floating element 303 is prevented from rotating beyond a predetermined range.

The rotatable holding of the floating element 303 is realized in the following manner. Sharp-pointed pivots 312 are respectively press-fitted into the upper and lower end faces of the floating element 303 along the central axis thereof as shown in FIG. 17 (a sectional view taken along line D—D of FIG. 16). The pivot bearings 306 are respectively provided at the extending ends of the upper and lower arms of the U-shaped floating-element holder 305 in the state of being opposed to each other in the inward direction. The sharp-pointed ends of the pivots 312 are respectively engaged with the pivot bearings 306 to hold the floating element 303.

A lid 313 is bonded to the cylindrical container 302 in a sealed manner by a known art utilizing a silicone adhesive or the like so that the liquid 304 is enclosed in the cylindrical container 302.

In the above-described arrangement, the floating element 303 has a symmetrical shape relative to the rotational axis 303a and is formed of a material having the same specific gravity as the liquid 304 so that an angular moment due to the influence of gravitation is prevented from occurring whatever attitude the floating element 303 may take and also so that a load is prevented from substantially acting on the pivot bearings 306. Although it is actually impossible to reduce unbalance components to zero, errors in shape are substantially extremely small since only differences in specific gravity give rise to unbalance. Accordingly, it will be readily understood that the S/N ratio of friction to inertia is extremely high.

In the above-described arrangement, even if the cylindrical container 302 rotates about the rotational axis 303a, the liquid 301 inside of the cylindrical container 302 is stationary with respect to absolute space owing to inertia. Accordingly, the floating element 303 which is in a floating state does not rotate, and the cylindrical container 302 and the floating element 303 rotate about the rotational axis 303a with respect to each other. Such relative angular displacement can be detected by the optical detecting means utilizing the light emitter 308 and the light receiver 309.

In the device having the above-described arrangement, the detection of the angular displacement is performed in the following manner.

Light emitted from the light emitter 308 passes through the slit 310a of the mask 310 and is projected onto the floating element 303, and the projected light is reflected by the slit-shaped reflecting surface of the projection 303a and reaches the light receiver 309. During this light transmission, the light is made approximately parallel light by the slit 310a and the slit-shaped reflecting surface, whereby an image which is not blurred is formed on the light receiver 309.

The cylindrical container 302, the light emitter 308 and the light receiver 309 are all fixed to the base plate 301 and therefore move integrally. If a relative angular displacement occurs between the cylindrical container 302 and the floating element 303, the slit image formed on the light receiver 309 moves by an amount corresponding to the relative angular displacement. Accordingly, the output of the light receiver 309, which is a photoelectric conversion device the output of which varies with the position where light is received, is proportional to the positional displacement of the slit image, whereby it is possible to detect the angular displacement of the cylindrical container 302 by utilizing the aforesaid output as information.

As described above, the floating element 303 is made of a permanent-magnet material having the same specific gravity as the liquid 304. The permanent-magnet material is prepared, for example, in the following manner.

In a case where a fluorine-based inactive liquid is used as the liquid 304, if a finely powdered permanent-magnet material (for example, ferrite) is prepared as a filler and is contained in a plastics material prepared as a base and the content of the finely-powdered permanent-magnet material is adjusted, it is possible to easily prepare a material having a specific gravity approximately equal to the specific gravity of the liquid 304 (1.8) in the neighborhood of a volume content of 8%. If the floating element 303 is magnetized along the axis 303a after it has been formed of such a material or at the same that it is formed of the material, the floating element 303 will have the nature of a permanent magnet.

FIG. 19 is a sectional view taken along line E—E of FIG. 16, representing the relations between the floating element 303, the yoke 307 and the wound coil 314.

As shown, the floating element 303 is magnetized along the axis 303a, and the upper side and the lower side are respectively magnetized as a north pole and an south pole, as shown in FIG. 19. A closed magnetic path is formed along which the magnetic lines of force exiting from the north pole pass through the yoke 307 of U-like cross section and reach the south pole. If an electric current is made to flow from the reverse side to the obverse side of the sheet of FIG. 19 through the wound coil 314 disposed in the magnetic path, the wound coil 314 is subject to a force in the direction of an arrow "f" in accordance with Fleming's left-hand rule. However, the wound coil 314 does not move because it is fixed to the cylindrical container 302 as described previously, with the result that a force works as a reaction in the direction of an arrow F and the floating element 303 is driven by the force. Needless to say, this force is proportional to the electric current flowing in the wound coil 314 and the direction of the force is reversed if an electric current is made to flow in the opposite direction. Therefore, according to the arrangement described above, it is possible to freely drive the floating element 303.

A spring force which is exerted on the floating element 303 by the above-described driving force is theoretically a force which maintains the floating element 303 in a fixed attitude with respect to the cylindrical container 302 (that is, a force which moves the floating element 303 integrally with the cylindrical container 303). If such a spring force is excessively strong, the cylindrical container 302 and the floating element 303 move integrally, thus resulting in the problem that a relative angular displacement for a desired angular displacement is not produced. However, if the driving force (spring force) is made sufficiently small with respect to the inertia of the floating element 303, it is possible to realize an arrangement which is also capable of responding to an angular displacement of relatively low frequency.

FIG. 20 is a diagram showing the electrical circuit of the above-described angular displacement detecting device.

Current-voltage conversion amplifiers 315a and 315b (as well as resistors R33 to R36) convert photoelectric currents 317a and 317b, which are produced in the light receiver 309 by reflected light 316 from the light emitter 308, into corresponding voltages, and a differential amplifier 318 (as well as resistors R37 to R40) finds the difference between the outputs of the current-voltage conversion amplifiers 315a and 315b, i.e., an angular difference (a relative angular displacement between the cylindrical container 302 and the liquid 303). The output of the differential amplifier 318 is divided into an extremely small output by resistors 319a and 319b. The extremely small output is inputted to the driving amplifier 320 (as well as a resistor R41 and transistors TR11 and TR12) for causing an electric current to flow through the wound coil 314, thereby carrying out negative feedback (the manner of wiring of the wound coil 314 and the direction of magnetization of the floating element 303 are set so that, when the differential amplifier 318 provides an output, the floating element 303 returns to its central position). Thus, a small spring force (driving force) is produced with respect to the inertia of the liquid 304 in the above-described manner.

An adder amplifier 321 (as well as resistors R42 to R45) finds the sum of the outputs of the current-voltage conversion amplifiers 315a and 315b (the total amount of which the reflected light 316 from the light emitter 308 has been received by the light receiver 309), and the output of the adder amplifier 321 is inputted to a driving amplifier 322 (as well as resistors R47, R48, a transistor TR13 and a capacitor C11) for causing the light emitter 308 to emit light.

The light emitter 308 tends to vary extremely unstably the amount of emission thereof with temperature or the like. However, by driving the light emitter 308 on the basis of the total amount of received light in the above-described manner, the total amount of photoelectric current outputted from the light receiver 309 is kept constant at all times, whereby it is possible to highly stabilize the angular-displacement detection sensitivity of the differential amplifier 318.

FIG. 21 shows the structure of a servo angular acceleration sensor which is another type of vibration sensor.

Referring to FIG. 21, a support part 324 is integrally fixed to an external-frame bottom 323, and a shaft 326 is supported at its opposite ends by the support part 324 as well as bearings 325a and 325b of the small friction type, such as ball bearings. A seesaw 328 to which coils 327a and 327b are attached is swingably supported by the shaft 326.

As shown in FIG. 21, magnetic circuit plates 330a and 330b each of which serves as a lid are spaced apart from and disposed above the coils 327a, 327b and the seesaw 328, while permanent magnets 331a, 332a and 331b, 332b are spaced apart from and disposed below the coils 327a, 327b and the seesaw 328. The magnetic circuit plate 330a is opposed to the permanent magnets 331a and 332a, while the magnetic circuit plate 330b is opposed to the permanent magnets 331b and 332b. As described above, the magnetic circuit plates 330a and 330b also serve as the lids for the external-frame bottom 323. The permanent magnets 331a, 332a and 331b, 332b are respectively mounted on magnetic circuit back plates 333a and 333b which are fixed to the underside of the external-frame bottom 323.

A slit plate 334 in which a slit 334a is formed to extend therethrough in the thickness direction is provided above the coil 327a of the seesaw 328. A photoelectric type of displacement detector 335, such as an SPC (Separate Photo Diode), is disposed on the magnetic circuit plate 330a which is positioned above the slit 334a and which also serves as the lid for the external-frame bottom 323. A light emitter 336, such as an infrared emission diode, is disposed on the magnetic circuit back plate 333a which is positioned below the slit 334a.

In the above-described arrangement, if it is assumed that an angular acceleration "a" works as indicated by an arrow 337 with respect to the external-frame bottom 323 of FIG. 20, the seesaw 328 relatively swings in the direction opposite to the direction in which the angular acceleration "a" works. The angle of this swing can be detected from the position on the displacement detector 335 of a beam transmitted from the light emitter 336 through the slit 334a.

Magnetic fluxes from the individual permanent magnets 331a and 331b flow through the permanent magnets 331a and 331b→the coils 327a and 327b→the magnetic circuit plates 330a and 330b→the coils 327a and 327b→the permanent magnets 331a and 331b, respectively. Magnetic fluxes from the individual permanent magnets 332a and 332b flow the permanent magnets 332a and 332b→the magnetic circuit back plates 333a and 333b→the permanent magnets 332a and 332b, respectively. Thus, these magnetic fluxes form a closed magnetic circuit as a whole and are respectively formed as magnetic fluxes acting in directions perpendicular to the coils 327a and 327b. By causing a control electric current to flow through the coils 327a and 327b, it is possible to move the seesaw 328 toward either end according to the direction of the swing provided by the angular acceleration "a", in accordance with Fleming's left-hand rule.

FIG. 22 shows one example of the arrangement of an angular acceleration detecting circuit for use in the servo angular acceleration sensor having the above-described arrangement.

The angular acceleration detecting circuit includes a detected-displacement amplifier 338 for amplifying the output from the displacement detector 335, a compensating circuit 339 for enabling this feedback circuit to serve as a stable circuit, a driving circuit 340 for amplifying the amplified output of t he detected-displacement amplifier 338 to a further amplified level of electric current and energizing the coils 327a and 327b, and the coils 327a and 327b. The displacement detector 335, the detected-displacement amplifier 338, the compensating circuit 339, the driving circuit 340 and the coils 327a and 327b are connected in series.

In this example, the direction of winding of each of the coils 327a and 327b and the polarity of each of the permanent magnets 331a, 331b, 332a and 332b are set so that if the coils 327a and 327b are energized, a force is produced in the direction opposite to the direction in which the seesaw 328 is swung by the external angular acceleration "a".

The operational principle of the servo angular acceleration sensor having the above-described arrangement will be described below. If it is assumed that the angular acceleration "a" is externally applied to the angular acceleration sensor having the above-described arrangement as shown in FIG. 22, the seesaw 328 swings by inertial force with respect to the external-frame bottom 323 in the direction opposite to the direction of the angular acceleration "a", whereby the slit 334a provided on the seesaw 328 moves in an L direction. Accordingly, the center of a pencil of light rays which is incident on the displacement detector 335 from the light emitter 336 is displaced, and the displacement detector 335 produces an output proportional to the amount of the displacement.

The output is amplified by the detected-displacement amplifier 338 as described above, and the output of the detected-displacement amplifier 338 is applied to the driving circuit 340 through the compensating circuit 339. The detected-displacement amplifier 338 amplifies the input from the compensating circuit 339 to a further amplified level of electric current and energizes the coils 327a and 327b.

As described above, when the control electric current is made to flow through the coils 327a and 327b, the seesaw 328 is subjected to a force which acts in an R direction opposite to the L direction of the external angular acceleration "a", and the control electric current is produced in the state of being adjusted so that the center of the pencil of light rays which is incident on the displacement detector 335 returns to its initial position where the center of the pencil of light rays is located when the external angular acceleration "a" is not acting.

The value of the control electric current which flows through the coils 327a and 327b during this time is proportional to a rotational force applied to the seesaw 328. Furthermore, the rotational force applied to the seesaw 328 is proportional to a force which tends to return the seesaw 328 to its original position, i.e., the magnitude of the external angular acceleration "a". Accordingly, by reading an electric current as a voltage V through a resistor 341, it is possible to find the magnitude of the angular acceleration "a" as the control information required for, for example, the image-shake correcting system of a camera.

FIG. 23 is a diagram showing more concretely the angular acceleration detecting circuit shown in FIG. 22.

In FIG. 23, an amplifier 338a and resistors 338b and 338c constitute the detected-displacement amplifier 338 and perform position detection by converting a photoelectric current from the displacement detector 335 into an amplified voltage. A capacitor 339a and resistors 339b and 339c constitute the compensating circuit 339. A driving amplifier 340a, transistors 340b, 340c and resistors 340d, 340e, 340f constitute the driving circuit 340 for driving the coils 327a and 327b.

However, in the related-art example, there are a number of problems concerning a relative inclination between the optical axis 101a of the correcting lens 101 and the optical axis of the photographic optical system. For example, since a number of members are used to support the correcting lens 101, the dimensional errors of the individual members accumulate to such an extent that it becomes difficult to maintain the relative inclination within an allowable value required to realize predetermined optical performance.

The correcting lens 101 is held by the fixing frame 103 and, for example, the inclination of the optical axis 101a of the correcting lens 101 relative to the yaw direction 102y is determined by the rotation stopper shaft 120p in cooperation with the slide bearings 104p, the pitch slide shaft 105p, the first holding frame 106 and the engagement groove 106a.

Furthermore, the inclination of the housing 114 with respect to the lens barrel when the housing 114 is mounted in the lens barrel exerts an influence on the inclination of the optical axis 101a of the correcting lens 101 relative to either of the yaw direction 102y and the pitch direction 102p. For this reason, it is necessary to strictly control the dimensional accuracy of each member which influences the relative inclination between the optical axis 101a of the correcting lens 101 and the optical axis of the photographic optical system.

FIG. 24 shows a correcting optical mechanism in which a rotation stopper is realized by using different mechanism elements, and the mechanical elements used for the rotation stopper will be described below with reference to FIG. 24. In FIG. 24, the same reference numerals are used to denote mechanical elements which have functions similar to those of the mechanical elements shown in FIG. 14, and description thereof is omitted herein. Driving means, vibration detecting means, a circuit arrangement and the like are similar to those shown in FIGS. 15 through 23.

In the correcting optical mechanism shown in FIG. 24, the correcting lens 101 is supported by the pitch slide shaft 105p and the yaw slide shaft 105y in such a manner as to be movable in the pitch and yaw directions 102p and 102y, as in the case of the correcting optical mechanism in FIG. 14. However, in this arrangement, the fixing frame 103 is rotatable about the pitch slide shaft 105p, while the first holding frame 106 which supports the fixing frame 103 is rotatable about the yaw slide shaft 105y.

As a result, the correcting lens 101 is not necessarily set in parallel with a plane 101b perpendicular to the optical axis 101a. To prevent occurrence of a rotation relative to either of the pitch and yaw directions 102p and 102y, rotation stoppers 127p and 127y are provided as shown in FIG. 24. The pitch rotation stopper 127p is provided integrally with the first holding frame 106, and the fixing frame 103 is slidably gripped by the extending end of the pitch rotation stopper 127p so that the fixing frame 103 is prevented from rotating about the pitch slide shaft 105p. The yaw rotation stopper 127y is fixed to a lens barrel (not shown), and the extending end of the yaw rotation stopper 127y also slidably grips the fixing frame 103 so that the fixing frame 103 is prevented from rotating about the yaw slide shaft 105y.

In principle, it is possible to prevent the rotations of the fixing frame 103 about the respective pitch and yaw slide shafts 105p and 105y by using only the yaw rotation stopper 127y. However, it is practically impossible to completely prevent the fixing frame 103 from rotating about the pitch slide shaft 105p by using only the pitch slide shaft 105p since there is a certain degree of looseness in the engagement between the slide bearings 104p and the pitch slide shaft 105p or between the slide bearing 104y and the yaw slide shaft 105y. For this reason, the rotation stopper 127p is provided.

Owing to the pitch rotation stopper 127p and the yaw rotation stopper 127y, the correcting lens 101 is allowed to make only a movement parallel to the plane 101b.

The reason why the pitch rotation stopper 127p is provided on the first holding frame 106 but not on the lens barrel (not shown) is as follows.

If the pitch rotation stopper 127p is provided on the lens barrel (not shown), there will be a case where a line segment 128, which connects the end of the fixing frame 103 through which the pitch slide shaft 105p is inserted and the end of the fixing frame 103 which is gripped by the pitch rotation stopper 127p, does not become parallel to a line segment 129 parallel to the yaw slide shaft 105y (it is difficult to make the line segments 128 and 129 ideally parallel to each other owing to the accumulation of the tolerances of individual parts). As a result, if the correcting optical mechanism is driven in the yaw direction 102y (in a direction parallel to the line segment 129), since the line segment 128 inclines with respect to the line segment 129, the pitch rotation stopper 127p may be brought into frictional contact with the fixing frame 103 to impair the movement of the fixing frame 103. However, if the pitch rotation stopper 127p is provided on the first holding frame 106, since the pitch rotation stopper 127p moves in the yaw direction 102y together with the first holding frame 106, such frictional contact does not take place.

With the above-described arrangement, it is possible to prevent the correcting optical mechanism from rotating about either of the pitch and yaw slide shafts 105p and 105y.

In the arrangement shown in FIG. 24, a plane containing the correcting lens 101 is determined by the combination of various members such as the pitch and yaw rotation stoppers 127p and 127y, the slide bearings 104p, the pitch slide shaft 105p, the first holding frame 106, the slide bearing 104y and the yaw slide shaft 105y. As a result, it is still difficult to make the plane containing the correcting lens 101 parallel to the plane 101b because of the accumulation of the tolerances of the individual parts and the mounting errors thereof.

The correcting optical mechanism is arranged to move the position of an image by making eccentric the correcting lens 101 in either of the pitch and yaw directions 102p and 102y. If the correcting lens 101 is designed so that each aberration of the correcting lens 101 can be accommodated in an allowable range, variations of the respective aberrations tend to easily increase when a small degree of inclination of the correcting lens 101 (with respect to the plane 101b) only occurs. For this reason, there is the problem that if the correcting lens 101 is not designed as a mechanism which can always move in parallel to the plane 101b, desired optical performance is remarkably deteriorated.

SUMMARY OF THE INVENTION

It is, therefore, an object of the present invention to solve the problems of the above-described related arts.

To achieve the above object, in accordance with one aspect of the present invention, there is provided an optical device, such as an image stabilizing device or a light deflecting device, including image-shake correcting optical means or light deflecting means for deflecting a flux of passing light rays by moving in a plane perpendicular to or approximately perpendicular to an optical axis of an optical system. The optical device is provided with adjustment means for adjusting a relative inclination of an optical axis of the image-shake correcting optical means or the light deflecting means with respect to the optical axis of the optical system. With this arrangement, it is possible to maintain optical performance at a high level without increasing the precision of each constituent part of means for supporting the image-shake correcting means or the light deflecting means.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below with reference to the accompanying drawings.

(First Embodiment)

Figure 1:
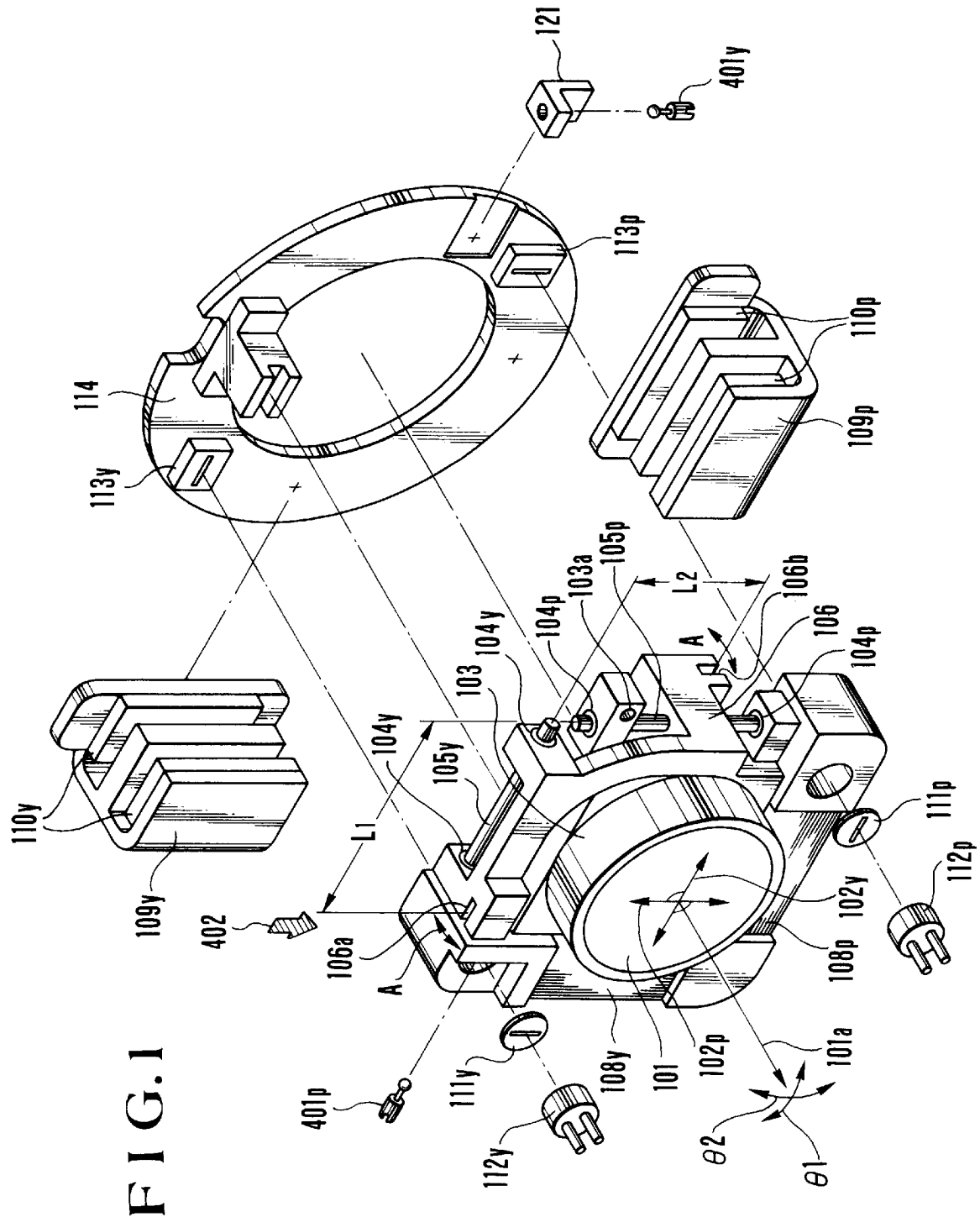
FIG. 1 is a perspective view showing the arrangement of the essential parts of an image stabilizing device according to a first embodiment of the present invention.
Figure 2:
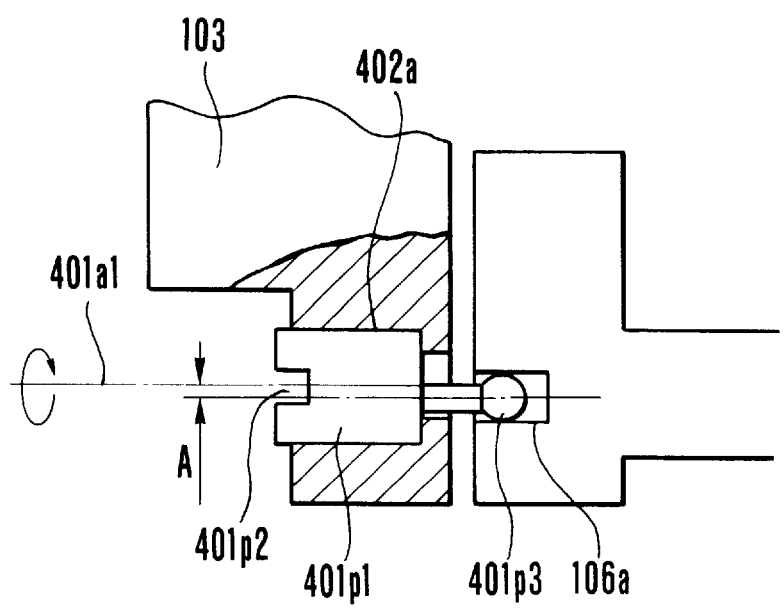
FIG. 2 is a schematic cross-sectional view aiding in explaining an optical-axis adjusting operation using the eccentric pin of FIG. 1.

FIGS. 1 and 2 are views showing the arrangement of the essential parts of a first embodiment of the present invention. In the figures, the same reference numerals are used to denote parts substantially identical to those shown in FIG. 14. (And in particular, pitch slide shaft 105p constitutes a first supporting member for supporting an image-shake correcting optical means (correcting lens 101) in such a manner that lens 101 is displaceable in a first direction (pitch direction 102p). In addition the housing support member constitutes a second supporting member for supporting lens 101 and the first supporting member (105p) in such a manner that they are moveable in a second direction (yaw direction 102y))

Figure 14:
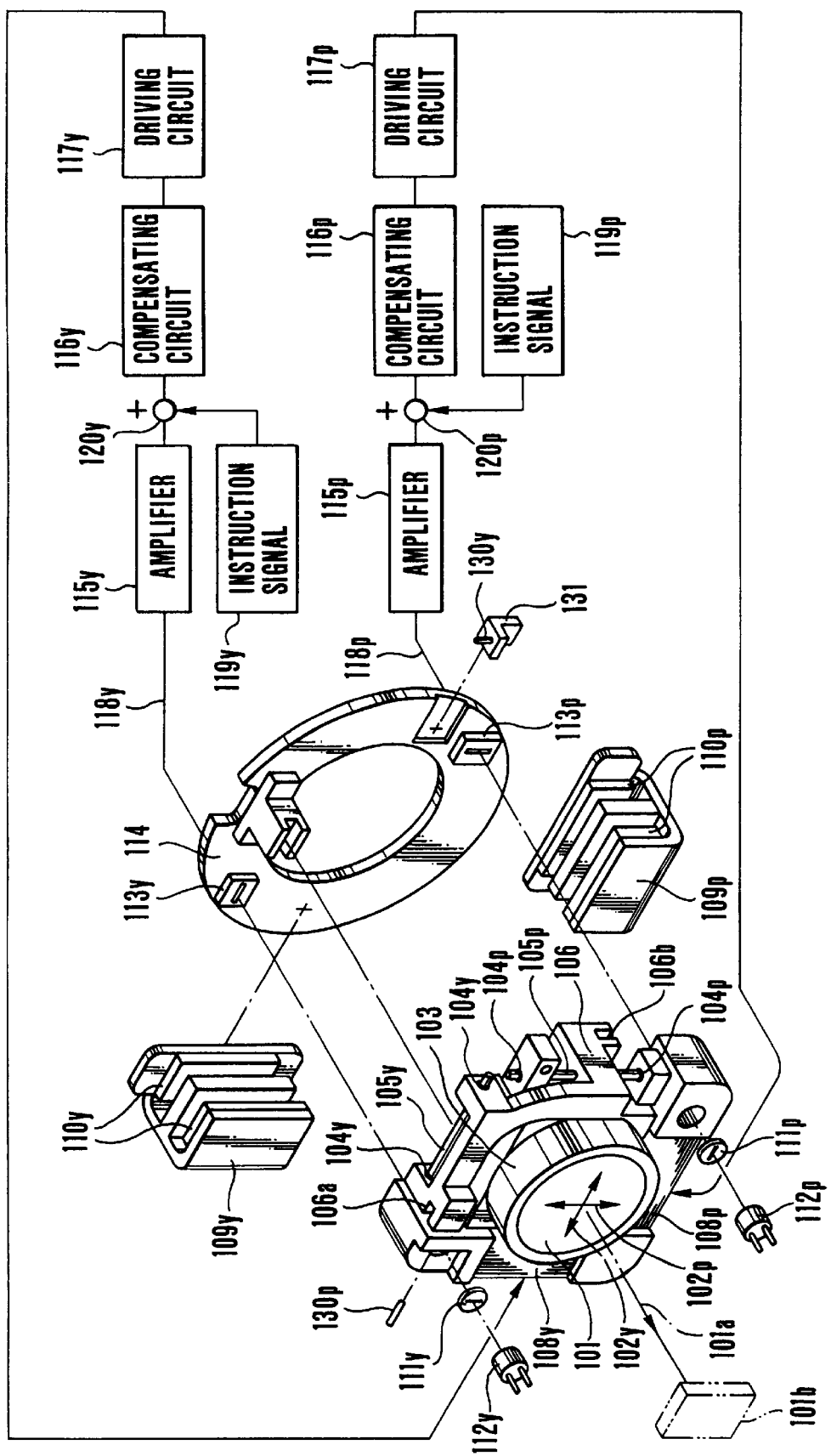
FIG. 14 is a view showing the mechanical and electrical arrangements of a correcting optical mechanism for a conventional image stabilizing device.

The difference between the first embodiment and the conventional example shown in FIG. 14 is that the shafts 130p and 130y of FIG. 14 are replaced with eccentric shafts 401p and 401y each having a spherical end.

The functions of the eccentric shafts 401p and 401y each having the spherical end will be described below with reference to FIG. 2 which shows only the eccentric shaft 401p by way of example in cross section as viewed in the direction of an arrow 402 of FIG. 1.

A cylindrical part 401p1 of the eccentric shaft 401p is inserted in a hole 402a of the fixing frame 103, and the eccentric shaft 401p can be rotated about a central axis 401a1 of the hole 402a by operating a screwdriver engaged with a slot 401p2. The center of a spherical part 401p3 of the eccentric shaft 401p is eccentric by a distance A with respect to the central axis 401a1 of the hole 402a, and the spherical part 401p3 is engaged with an engagement groove 106a of the first holding frame 106. The eccentric shaft 401p integral with the fixing frame 103 is slidable in opposite directions perpendicular to the surface of the sheet of FIG. 2 (along the axis of the pitch slide shaft 105p of FIG. 1).

Accordingly, it is possible to slide the fixing frame 103 in either of the opposite directions perpendicular to the surface of the sheet of FIG. 2 in the state of being displaced by a maximum of the distance A with respect to the engagement groove 106a of the first holding frame 106 by rotating the eccentric shaft 401p about the central axis 401a1.

Returning to FIG. 1, if the distance between the center of the pitch slide shaft 105p and the point of contact between the engagement groove 106a and the spherical part 401p3 of the eccentric shaft 401p is represented by L1, the fixing frame 103 is rotatable about the pitch slide shaft 105p by a maximum angle θ1 (=A/L1).

This indicates that the optical axis 101a of the correcting lens 101 held by the fixing frame 103 can be inclined by the maximum angle θ1 (=A/L1) in a plane defined by the optical axis 101a and the yaw direction 102y.

Another eccentric shaft 401y has the same shape as the eccentric shaft 401p, and is press-fitted into a fixing member 121 instead of the hole 402a of the fixing frame 103. Accordingly, if the distance between the center of the yaw slide shaft 105y and the point of contact between the engagement groove 106b and a spherical part of the eccentric shaft 401y is represented by L2, the first holding frame 106 can be rotated about the yaw slide shaft 105y by a maximum angle θ2 (A/L2) by rotating the eccentric shaft 401y.

This indicates that the fixing frame 103 can be rotated about the yaw slide shaft 105y by the maximum angle θ2 (=A/L2) because of the structure in which the fixing frame 103 is mounted on the first holding frame 106 by means of the pitch slide shaft 105p.

This indicates that the optical axis 101a of the correcting lens 101 held by the fixing frame 103 can be inclined by the maximum angle θ2 (=A/L2) in a plane defined by the optical axis 101a and the pitch direction 102p.

If the amount of eccentricity, "A", of each of the eccentric shafts 401p and 401y is set to a value which certainly enables a relative inclination between the optical axis 101a of the correcting lens 101 and the optical axis of the photographic optical system to be adjusted to a predetermined value or less, it is possible to effect adjustment to certainly reduce a relative inclination between the optical axis 101a of the correcting lens 101 and the optical axis of the photographic optical system to the predetermined value or less by rotating the eccentric shafts 401p and 401y, in whatever direction the relative inclination may occur.

Even in the case of the correcting optical mechanism alone, it is possible to perform such adjustment on the basis of the mounting position thereof by using a collimator. It is also possible to maintain performance obtainable immediately after the adjustment by applying an adhesive to the eccentric shafts 401p and 401y for the purpose of preventing rotation of the eccentric shafts 401p and 401y.

According to the above-described first embodiment, within the correcting optical mechanism which constitutes optical correcting means, it is possible to adjust a relative inclination between the optical axis 101a of the correcting lens 101 and the optical axis of the photographic optical system by inclining, particularly, the fixing frame 103 which holds the correcting lens 101 with respect to the optical axis of the photographic optical system by means of the eccentric shafts 401p and 401y.

According to the above-described arrangement, it is possible to achieve advantages such as those described below.

1) The relative inclination between the optical axis of the photographic optical system and the optical axis 101a of the correcting lens 101 of the correcting optical mechanism which constitutes optical correcting means can be adjusted to the predetermined value or less.

2) To achieve the advantage 1), it is not necessary to add any special part and conventional shafts need only to be replaced with the eccentric shafts. It is also unnecessary to increase space.

3) No extremely high precision part which would have heretofore been required is needed to reduce such a relative inclination to the predetermined value or less. Accordingly, it is possible to reduce the relative inclination to the predetermined value or less by means of the aforesaid adjustment.

4) Such adjustment can be conducted with the correcting optical mechanism alone.

(Second Embodiment)

Figure 3:
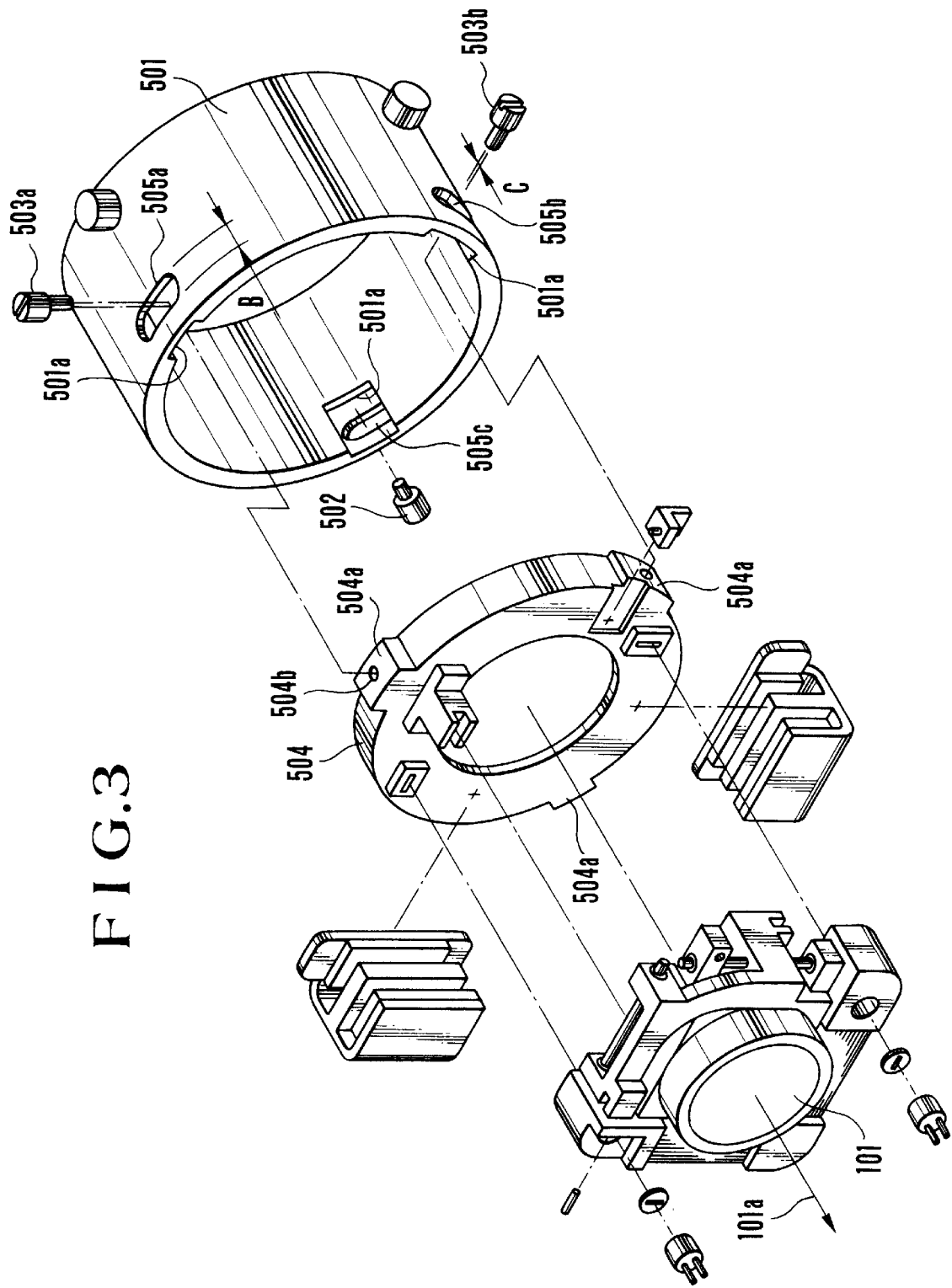
FIG. 3 is a perspective view showing the arrangement of the essential parts of an image stabilizing device according to a second embodiment of the present invention.
Figure 4:
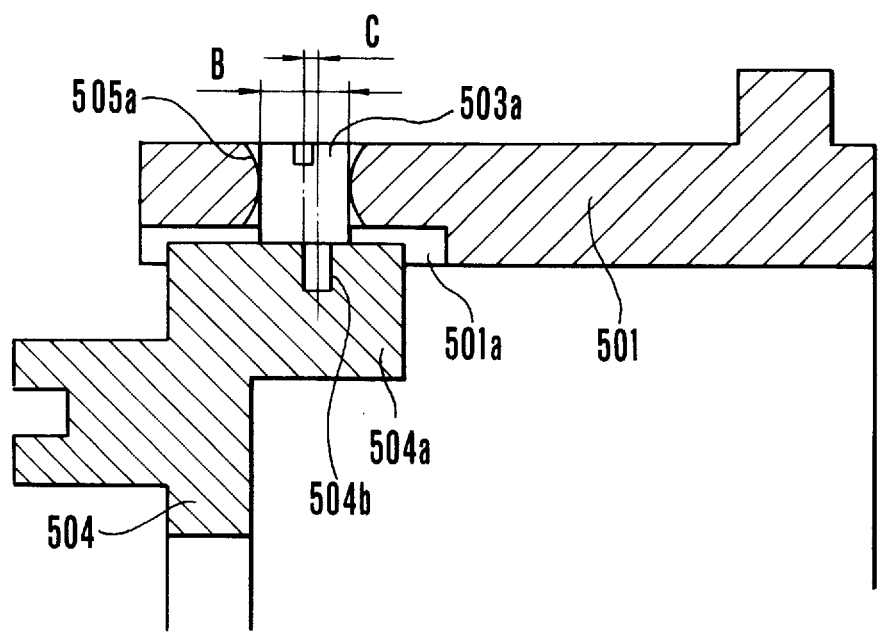
FIG. 4 is a schematic cross-sectional view aiding in explaining an optical-axis adjusting operation using the eccentric pin of FIG. 3.
Figure 5:
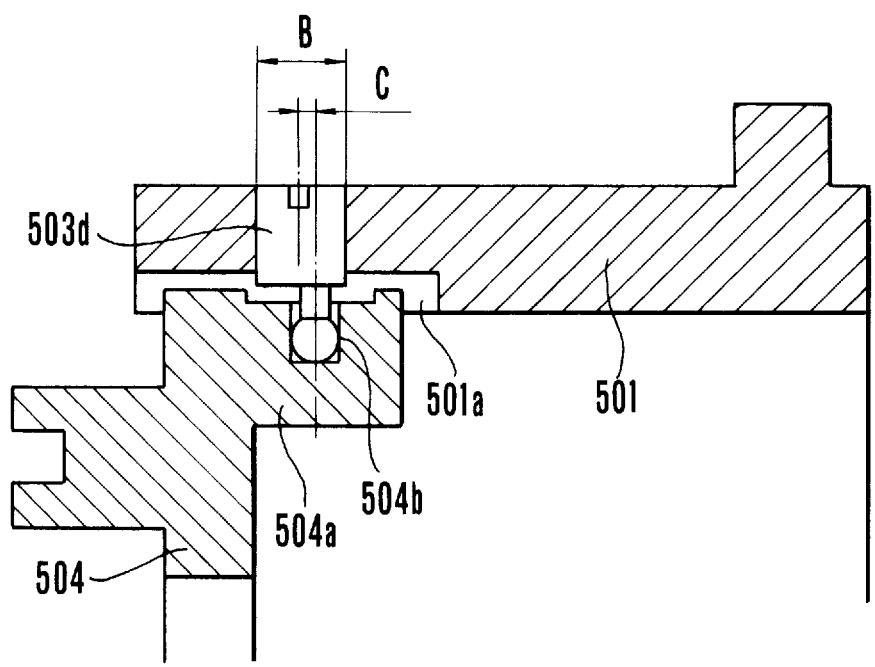
FIG. 5 is a schematic cross-sectional view showing a partial modification of the second embodiment.

FIGS. 3 through 5 are views showing the arrangement of the essential parts of a second embodiment of the present invention, and in the figures the same reference numerals are used to denote constituent parts which are substantially identical to those shown in FIG. 1.

One difference between the second embodiment and the first embodiment is that the housing 114 of FIG. 1 is replaced with a housing 504 which is shaped to be attachable to a tube 501 having three rollers engageable with corresponding cams of another tube. Another difference is that the housing 504 is attached to the tube 501 by means of one concentric pin 502 and two eccentric pins 503a and 503b each having the amount of eccentricity C.

Three projections 504a are provided at equally spaced intervals around the external circumference of the housing 504, and three holes 504b into which the small-diameter ends of the concentric pin 502 and the eccentric pins 503a and 503b are to be respectively press-fitted are formed at equally spaced intervals in the external faces of the three projections 504a, respectively. The housing 504 is fitted into the tube 501 with the three equally spaced projections 504a being engaged with grooves 501a as rotation stoppers. In this arrangement, the housing 504 is held in position in the state of being inhibited from rotating about the optical axis with respect to the tube 501.

Slots 505a, 505b and 505c are respectively present on the external circumferential sides of the three grooves 501a of the tube 501 in circumferentially spaced apart relation. The slots 505a, 505b and 505c each have a width B and are respectively engageable with the large-diameter ends of the eccentric pins 503a, 503b and the concentric pin 502.

After the housing 504 is inserted into the tube 501, the small-diameter ends of the eccentric pins 503a and 503b and the concentric pin 502 are respectively press-fitted into the holes 504b of the housing 504 with the large-diameter ends of the eccentric pins 503a, 503b and the concentric pin 502 brought into engagement with the respective slots 505a, 505b and 505c on the external circumferential side of the tube 501. Thus, the housing 504 is attached to the tube 501.

In this attached state, by selectively rotating the two eccentric pins 503a and 503b by means of a screwdriver or the like while fitting it into either of the slots of their respective large-diameter ends, it is possible to move the housing 504 along the optical axis at two locations, i.e., at the engagement portion between the eccentric pin 503a and the slot 505a and at the engagement portion between the eccentric pin 503b and the slot 505b, by utilizing the engagement portion between the concentric pin 502 and the slot 505c of the tube 501 as a pivotal point.

Accordingly, it is possible to move the optical axis of the correcting lens 101 attached to the housing 504 in any direction.

If the amount of eccentricity, "C", of each of the eccentric pins 503a and 503b is set to a value which certainly enables a relative inclination between the optical axis 101a of the correcting lens 101 and the optical axis of the photographic optical system to be adjusted to a predetermined value or less, it is possible to effect adjustment to certainly reduce a relative inclination between the optical axis 101a of the correcting lens 101 and the optical axis of the photographic optical system to the predetermined value or less by rotating the eccentric pins 503a and 503b, in whatever direction the relative inclination may occur.

FIG. 4 is a cross-sectional view showing the eccentric pin 503a.

Since the housing 504 is inclined with respect to the tube 501 if the eccentric pin 503a is rotated, a clearance is provided around the external circumference of the housing 504. The engagement portion between the slot 505a and the eccentric pin 503a is selected to form point contact as viewed in cross section so that even if the housing 504 is inclined during adjustment, the eccentric pin 503a is prevented from being limited by the engagement portion between the slot 505a and the eccentric pin 503a.

FIG. 5 shows a modification of the example of FIG. 4. In the modification, an eccentric pin 503d having a spherical end is used in place of each of the eccentric pins 503a and 503b. In this arrangement, even if the housing 504 greatly inclines, the eccentric pin 503d is not limited by the engagement portion between the eccentric pin 503d and the slot 505a, whereby it is possible to perform adjustment corresponding to the amount of eccentricity, "C".

According to the above-described second embodiment, even in the case of the correcting optical mechanism alone, it is possible to perform such adjustment on the basis of the mounting position thereof by using a collimator. It is also possible to maintain performance obtainable immediately after the adjustment by applying an adhesive to the eccentric pins 503a and 503b for the purpose of preventing rotation of the eccentric pins 503a and 503b.

According to the above-described second embodiment, in a portion for supporting the correcting optical mechanism which constitutes optical correcting means, it is possible to adjust a relative inclination between the optical axis 101a of the correcting lens 101 and the optical axis of the photographic optical system by inclining the entire correcting optical mechanism with respect to the optical axis of the photographic optical system.

According to the above-described arrangement, it is possible to achieve advantages such as those described below.

1) The relative inclination between the optical axis of the photographic optical system and the optical axis 101a of the correcting lens 101 of the correcting optical mechanism which constitutes optical correcting means can be adjusted to the predetermined value or less.

2) The advantage 1) can be achieved only by replacing attaching members for attaching the correcting optical mechanism to the tube 501 with the two eccentric pins 503a and 503b. Accordingly, a substantial increase in cost or space is not involved.

3) No extremely high precision part which would have heretofore been required is needed to reduce such a relative inclination to the predetermined value or less. Accordingly, it is possible to reduce the relative inclination to the predetermined value or less by means of the aforesaid adjustment.

4) Such adjustment can be conducted after the correcting optical mechanism has been attached to the tube 501.

Accordingly, even after a lens barrel for supporting a photographic lens has been incorporated in such a manner as to surround the periphery of the tube 501, if there are holes or space which allows the two eccentric pins 503a and 503b to be rotated, it is possible to adjust the relative inclination between the optical axis 101a of the correcting lens 101 and the optical axis of the photographic optical system to the predetermined value or less.

As described above, according to each of the first and second embodiments, there is provided adjustment means for adjusting a relative inclination of the optical axis of the correcting lens with respect to the optical axis of the photographic optical system, so that adjustment of the optical axis of the correcting lens is performed through the adjustment means. Accordingly, it is possible to maintain the optical performance of the photographic optical system at a high level without increasing the precision of each constituent part.

(Third Embodiment)

Figure 24:
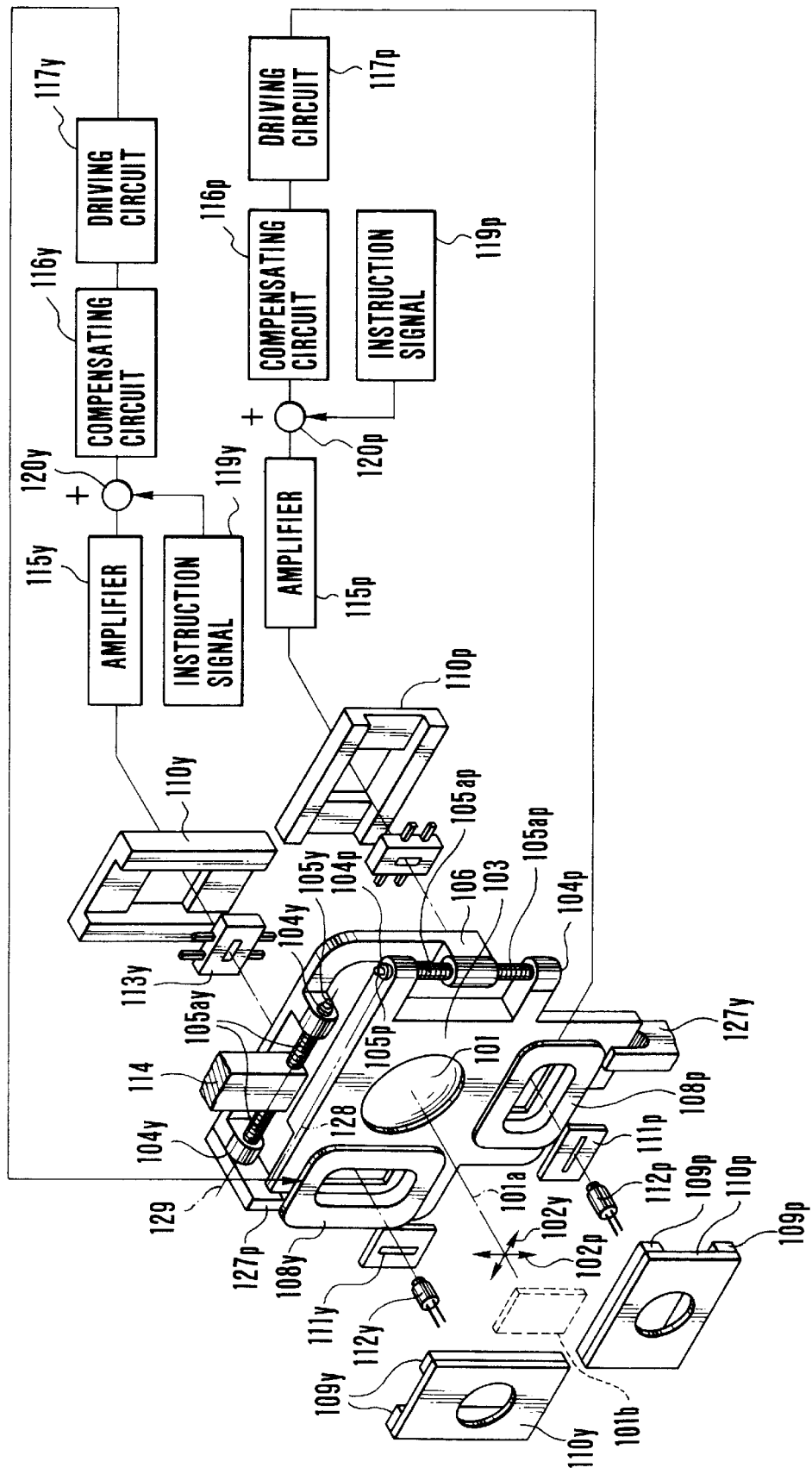
FIG. 24 is a view showing the mechanical and electrical arrangements of a correcting optical mechanism for another conventional image stabilizing device.

FIGS. 6A through 6C shows a third embodiment of the present invention. In FIGS. 6A through 6C, the same reference numerals are used to denote members substantially identical to those shown in FIG. 24 as well as members having functions substantially identical to the functions of those shown in FIG. 24.

Figure 6:
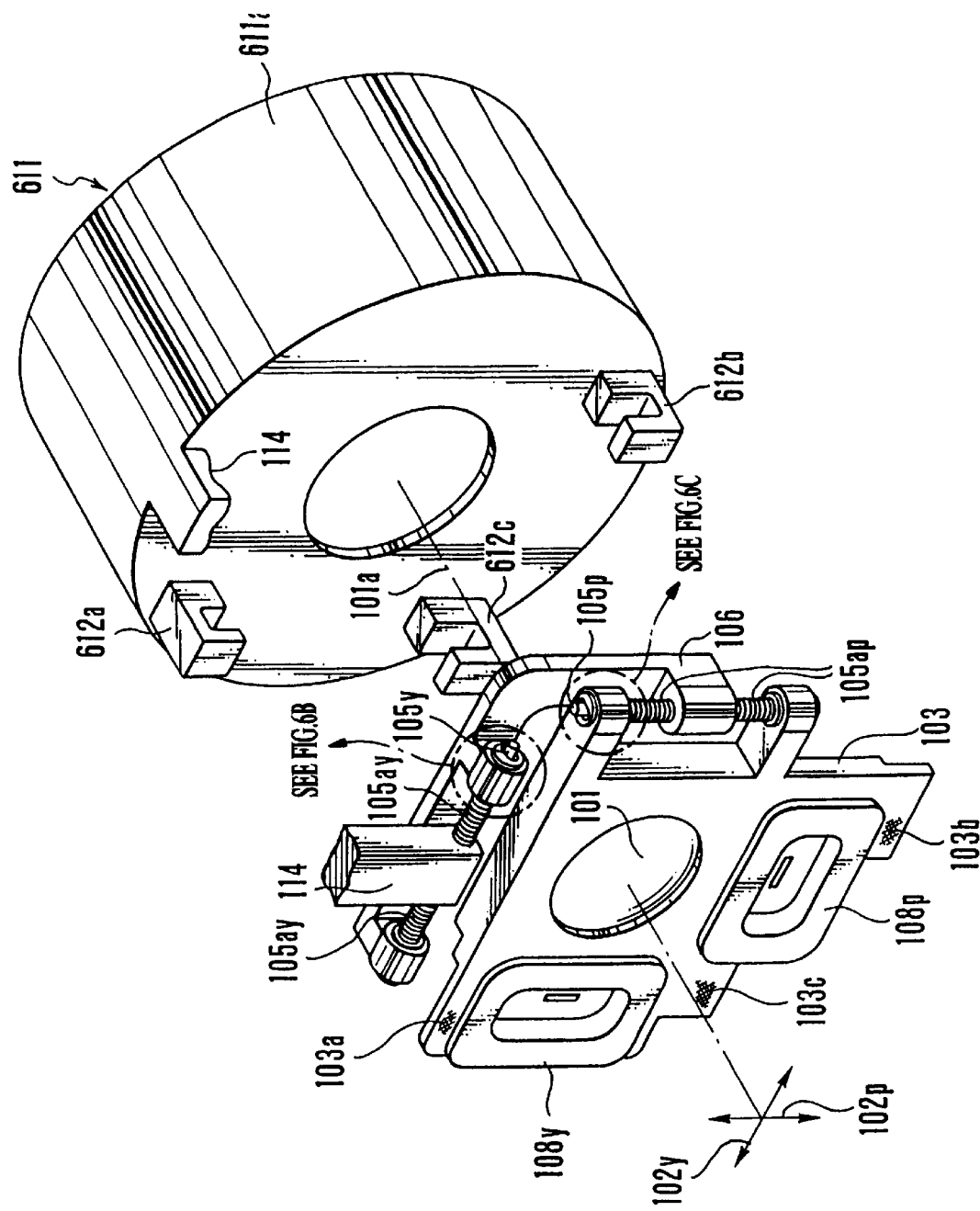
FIG. 6A is a perspective view showing the arrangement of the essential parts of a camera having an image stabilizing device according to a third embodiment of the present invention.
FIGS. 6B and 6C are fragmentary enlarged views of FIG. 6A

Referring to FIGS. 6A through 6C, a circumferential face 611a of a supporting frame (or tube) 611 is fitted into a lens barrel (not shown) in such a manner as to be supported movably along only the optical axis, and three supporting points 612a, 612b and 612c are provided on the supporting frame 611. The grooves of the respective supporting points 612a, 612b and 612c are brought into engagement with corresponding projections 103a, 103b and 103c which are shown on the fixing frame 103 of the correcting optical mechanism by cross hatching. Although the housing 114 is provided integrally with the supporting frame 611, in FIG. 6, the housing 114 is shown as being separated from the supporting frame 611 for the purpose of illustration.

In the above-described arrangement, since the fixing frame 103 is clamped by the three supporting points 612a, 612b and 612c, a plane which contains the correcting lens 101 is determined by the three supporting points 612a, 612b and 612c. Also, since all the three supporting points 612a, 612b and 612c are directly provided on the supporting frame 611 and no intermediate members are interposed between the supporting points 612a, 612b and 612c and the supporting frame 611, no dimensional tolerance accumulates and the plane which contains the correcting lens 101 can be made approximately ideally perpendicular to the optical axis 101a.

Since the plane of the correcting optical mechanism is also limited by the pitch and yaw slide shafts 105p and 105y, if such a plane is not parallel to the plane determined by the three supporting points 612a, 612b and 612c, the fixing frame 103 becomes unable to move smoothly in the pitch direction 102p or the yaw direction 102y. For this reason, the pitch slide shaft 105p and the yaw slide shaft 105y are respectively engaged with the slide bearing 104p and the slide bearing 104y by means of slots 613p and 613y (refer to fragmentary enlarged views (FIGS. 6B and 6C) each of which is shown in a circle drawn by an alternate long and short dash line in FIG. 6). The plane of the correcting optical mechanism is not determined by the two pitch and yaw slide shafts 105p and 105y, and the two pitch and yaw slide shafts 105p and 105y serve to limit only the rotation of the correcting optical mechanism about the optical axis 101a. In other words, the slide bearings 104p and 104y, the pitch and yaw slide shafts 105p and 105y, the first holding frame 106 and the housing 114 function as rotation limiting means.

According to the above-described arrangement, since the correcting optical mechanism is driven in either of the pitch and yaw directions 102p and 102y in the plane completely perpendicular to the optical axis 101a, the optical performance of the photographic optical system is prevented from deteriorating owing to the above-described problem that "the plane cannot be made completely perpendicular to the optical axis 101a". Further, since the correcting optical mechanism is rotationally limited, the thrust directions of the pitch coil 108p and the yaw coil 108y can be kept parallel to the pitch direction 102p and the yaw direction 102y, respectively.

(Fourth Embodiment)

Figure 7:
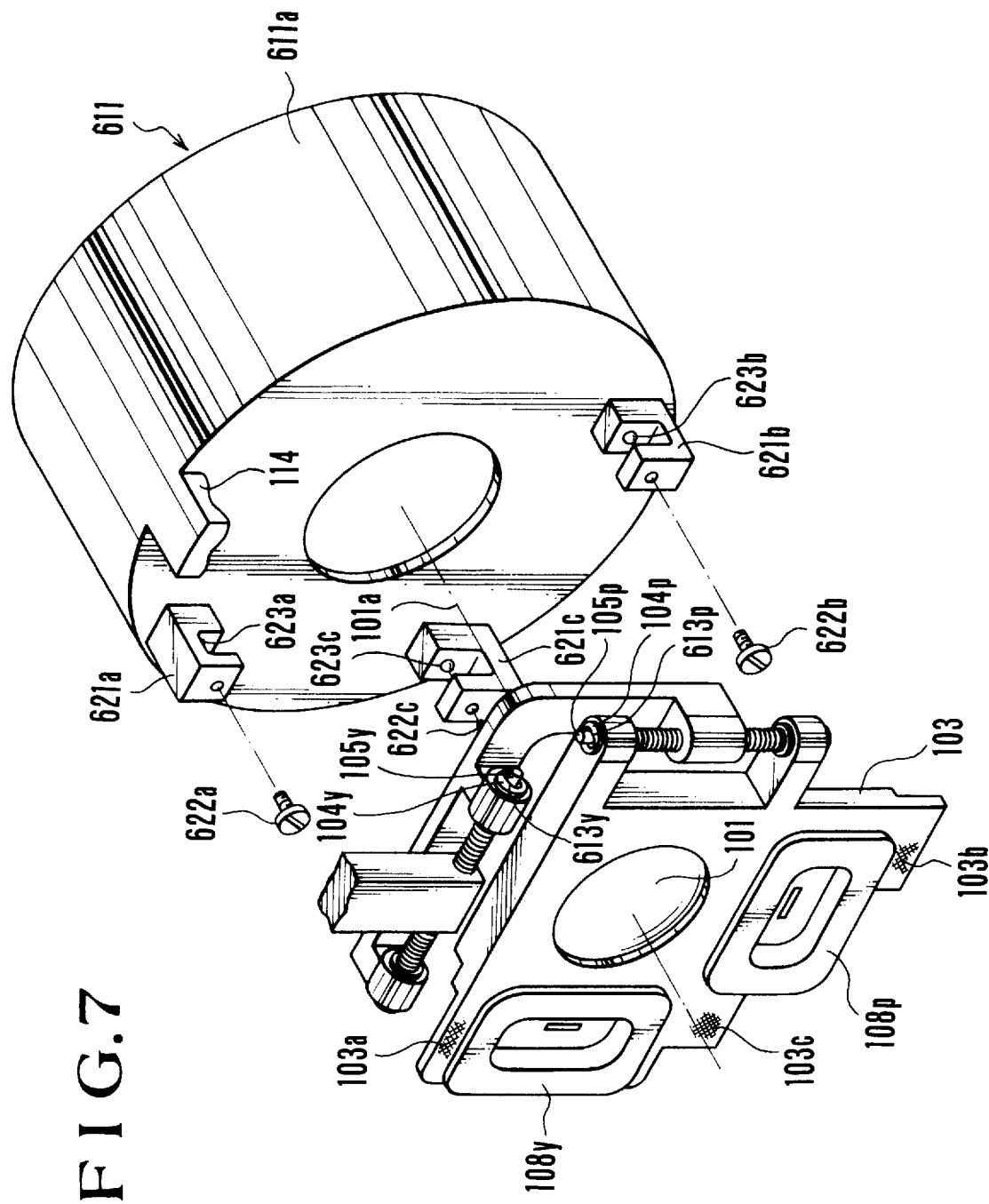
FIG. 7 is a perspective view showing the arrangement of the essential parts of a camera having an image stabilizing device according to a fourth embodiment of the present invention.

FIG. 7 is a perspective view showing the arrangement of the essential parts of a fourth embodiment of the present invention.

Three supporting points 621a, 621b and 621c (which correspond to the supporting points 612a, 612b and 612c shown in FIG. 6A) are integrally provided on the supporting frame 611. The supporting points 621a, 621b and 621c are respectively provided with spherical projections 623a, 623b and 623c, and the vertexes of the spherical projections 623a, 623b and 623c are in contact with the fixing frame 103. As compared to the third embodiment, each of the supporting points 621a, 621b and 621c has an axially enlarged groove, and the projections 103a, 103b and 103c of the fixing frame 103 are movably fitted into the respective grooves of the supporting points 621a, 621b and 621c. Machine screws 622a, 622b and 622c each having a spherical end are respectively screwed into internal threaded holes which are individually formed in the supporting points 621a, 621b and 621c, and adjustment is performed until the projections 103a, 103b and 103c of the fixing frame 103 are tightly clamped between the vertexes of the respective machine screws 622a, 622b and 622c and the vertexes of the corresponding spherical projections 623a, 623b and 623c.

Unlike the embodiment shown in FIGS. 6A through 6C, by performing the aforesaid adjustment, it is also possible to remove looseness from the engagement between the respective grooves of the supporting points 621a, 621b and 621c and the corresponding projections 103a, 103b and 103c.

(Fifth Embodiment)

Figure 8:
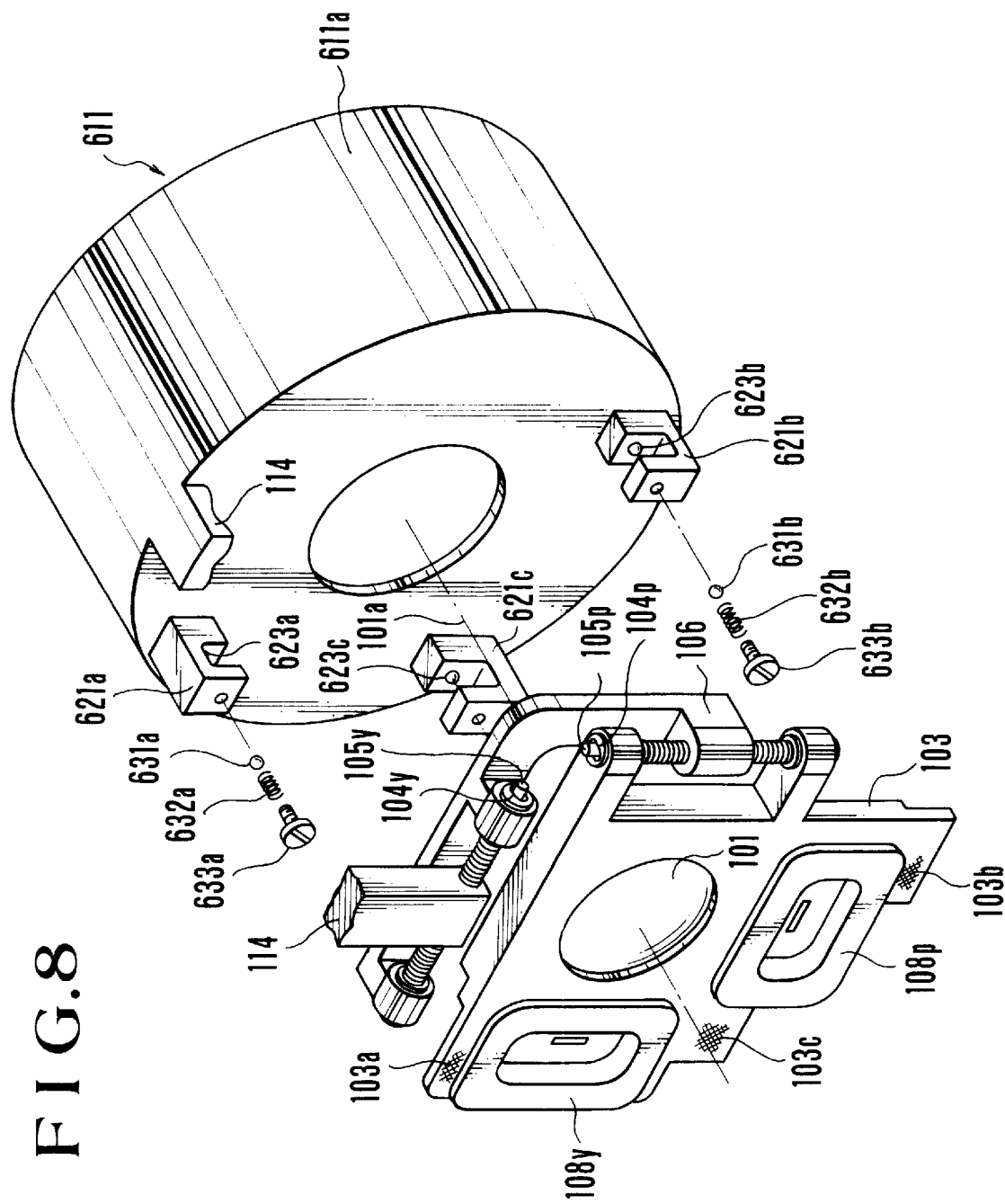
FIG. 8 is a perspective view showing the arrangement of the essential parts of a camera having an image stabilizing device according to a fifth embodiment of the present invention.

FIG. 8 is a perspective view showing the arrangement of the essential parts of a fifth embodiment of the present invention.

The major difference between the fifth embodiment and the fourth embodiment shown in FIG. 7 is as follows. Steel balls 631a, 631b and 631c (631c is not shown) are respectively urged against the supporting points 621a, 621b and 621c by springs 632a, 632b and 632c (632c is not shown) and the steel balls 631a, 631b, 631c and the springs 632a, 632b, 632c are respectively secured by machine screws 633a, 633b and 633c. The projections 103a, 103b and 103c of the fixing frame 103 are respectively clamped between the steel balls 631a, 631b and 631c and the spherical projections 623a, 623b and 623c, whereby pressure is applied to the fixing frame 103 in the direction parallel to the optical axis 101a by the springs 632a, 632b and 632c.

According to the above-described arrangement, it is possible to omit the aforesaid adjustment operation needed in the fourth embodiment, and it is also possible to completely reduce the aforesaid engagement looseness by applying the pressure to the fixing frame 103.

In the fifth embodiment shown in FIG. 8, the slide bearings 104p and 104y each have a hole which is not formed as the slot 613p or 613y shown in FIG. 7, and the pitch and yaw slide shafts 105p and 105y are respectively engaged with the slide bearings 104p and 104y with a small degree of looseness. Owing to the presence of such engagement looseness, it is possible to solve the problem that the fixing frame 103 becomes unable to move smoothly if the plane determined by the three supporting points 612a, 612b and 612c and the plane of the fixing frame 103 determined by the pitch slide shaft 105p and the yaw slide shaft 105y are not parallel to each other. In this case, the correcting lens 101 is allowed to slightly rotate about the optical axis 101a (owing to the presence of the engagement looseness). However, since the rotation is slight, the fact that the thrust directions of the respective pitch and yaw coils 108p and 108y differ from the pitch and yaw driving directions is not a serious problem.

(Sixth Embodiment)

Figure 9:
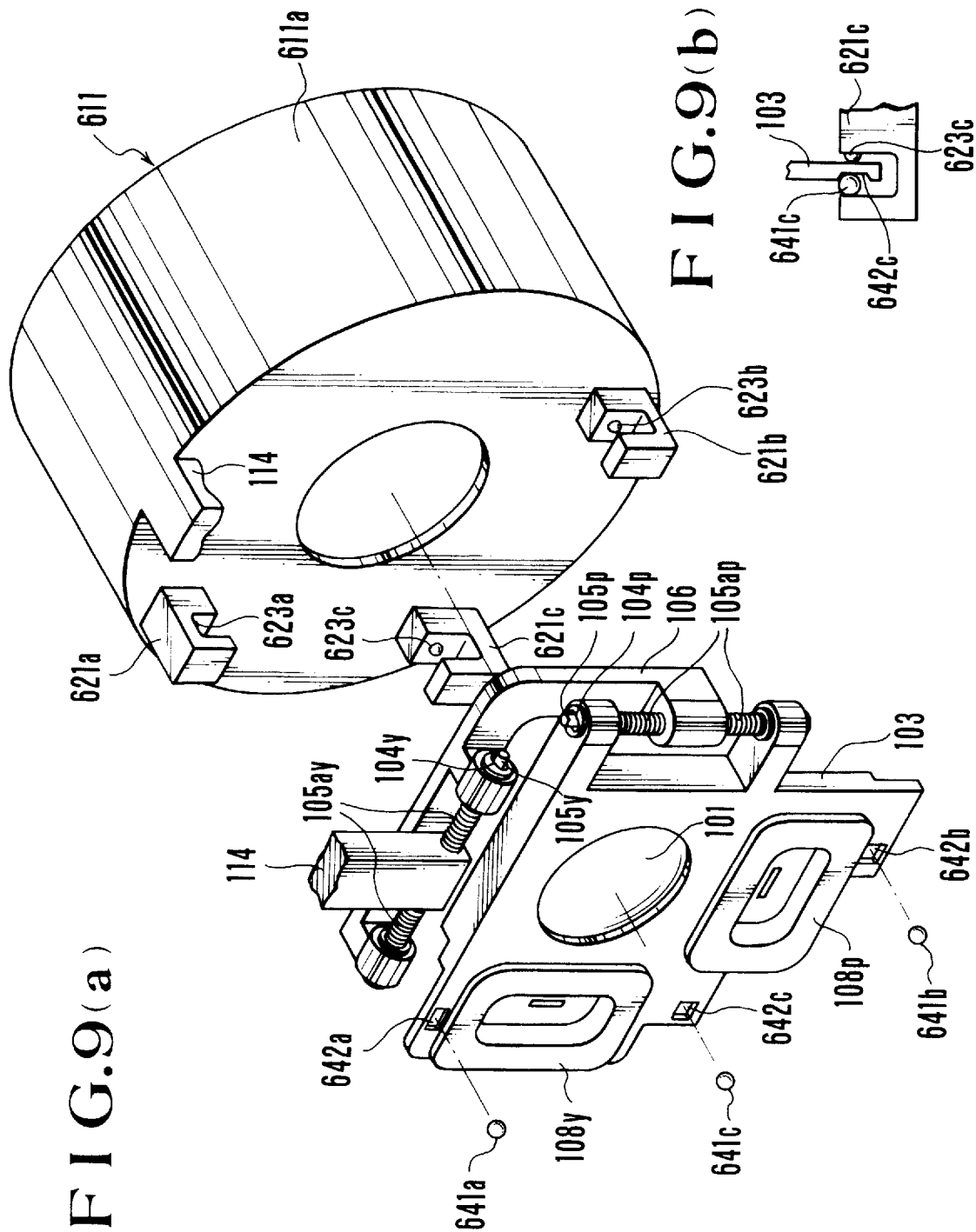
FIGS. 9(a) and 9(b) are views showing the arrangement of the essential parts of a camera having an image stabilizing device according to a sixth embodiment of the present invention.

FIGS. 9(a) and 9(b) are views showing the arrangement of the essential parts of a sixth embodiment of the present invention. In FIGS. 9(a) and 9(b), the same reference numerals are used to denote members substantially identical to those shown in FIGS. 6A through 8 as well as members having functions substantially identical to the functions of those shown in the figures.

The difference between the sixth embodiment and the fifth embodiment of FIG. 8 only resides in pressure applying means.

In the sixth embodiment, grooves are respectively formed in projections 642a, 642b and 642c of the fixing frame 103, and balls 641a, 641b and 641c formed of elastic material are placed in the respective grooves. The balls 641a, 641b and 641c and the projections 642a, 642b and 642c of the fixing frame 103 are respectively fitted into the grooves of the supporting points 621a, 621b and 621c (refer to FIG. (b)). The axial widths of the supporting points 621a, 621b and 621c are selected so that the balls 641a, 641b and 641c which are fitted into the grooves are slightly deformed to force the fixing frame 103 against the spherical projections 623a, 623b and 623c of the supporting points 621a, 621b and 621c. Accordingly, pressure is applied to the fixing frame 103 and the plane thereof is determined by the three spherical projections 623a, 623b and 623c. If the fixing frame 103 is driven, the elastic balls 641a, 641b and 641c can roll in their deformed states, so that they can applying pressure to the fixing frame 103 without adversely affecting the driving.

Although the aforesaid pressure applying means is not a limiting example, it is important that all the three supporting points 621a, 621b and 621c are provided on a single member and pressure is applied to them. According to this arrangement, it is possible to hold the correcting optical mechanism without looseness and in a plane perpendicular to the optical axis 101a.

(Seventh Embodiment)

In each of the above-described third to sixth embodiments, the pitch slide shaft 105p, the yaw slide shaft 105y, the first holding frame 106 and so on are provided as the rotation limiting means. However, none of the aforesaid rotation limiting means is a limiting example. Another example will be described below as a seventh embodiment of the present invention.

Figure 10:
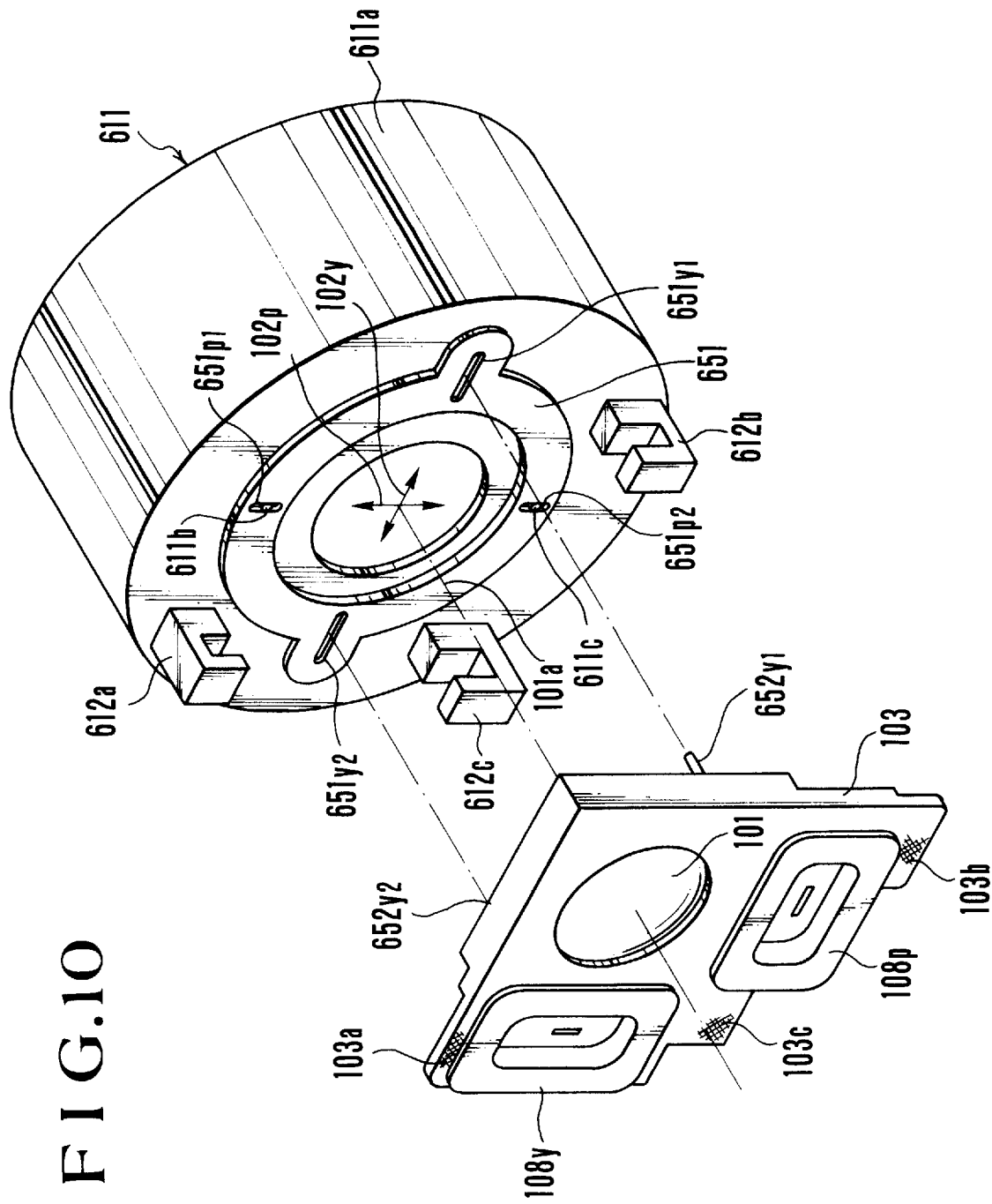
FIG. 10 is a perspective view showing the arrangement of the essential parts of an image stabilizing device according to a seventh embodiment of the present invention.

FIG. 10 is a perspective view showing the arrangement of the essential parts of the seventh embodiment of the present invention. The supporting frame 611 is provided with a pitch holding plate 651, and slots 651p1 and 651p2 are respectively engaged with shafts 611b and 611c provided on the supporting frame 611, whereby the pitch holding plate 651 is supported in such a manner as to be movable in the pitch direction 102p with respect to the supporting frame 611. Also, shafts 652y1 and 652y2 (652y2 is hidden and invisible) provided on the fixing frame 103 are respectively engaged with slots 651y1 and 651y2 provided on the pitch holding frame 651, whereby the fixing frame 103 is supported in such a manner as to be movable in the yaw direction 102y with respect to the pitch holding plate 651.

In other words, the fixing frame 103 is supported in such a manner as to be movable in either of the pitch direction 102p and yaw direction 102y with respect to the supporting frame 611. However, the rotation of the pitch holding plate 651 about the optical axis 101a with respect to the supporting frame 611 is limited (owing to the two-point engagement provided by the shafts 611b and 611c), and also the rotation of the fixing frame 103 about the optical axis 101a with respect to the pitch holding plate 651 is limited, whereby the rotation of the fixing frame 103 about the optical axis 101a with respect to the supporting frame 611 is limited.

The pitch holding plate 651 serves as rotation limiting means in the embodiment shown in FIG. 10, so that the thrust directions of the respective pitch and yaw coils 108p and 108y are prevented from differing from the corresponding moving directions (the pitch direction 102p and yaw direction 102y).

(Eighth Embodiment)

Figure 11:
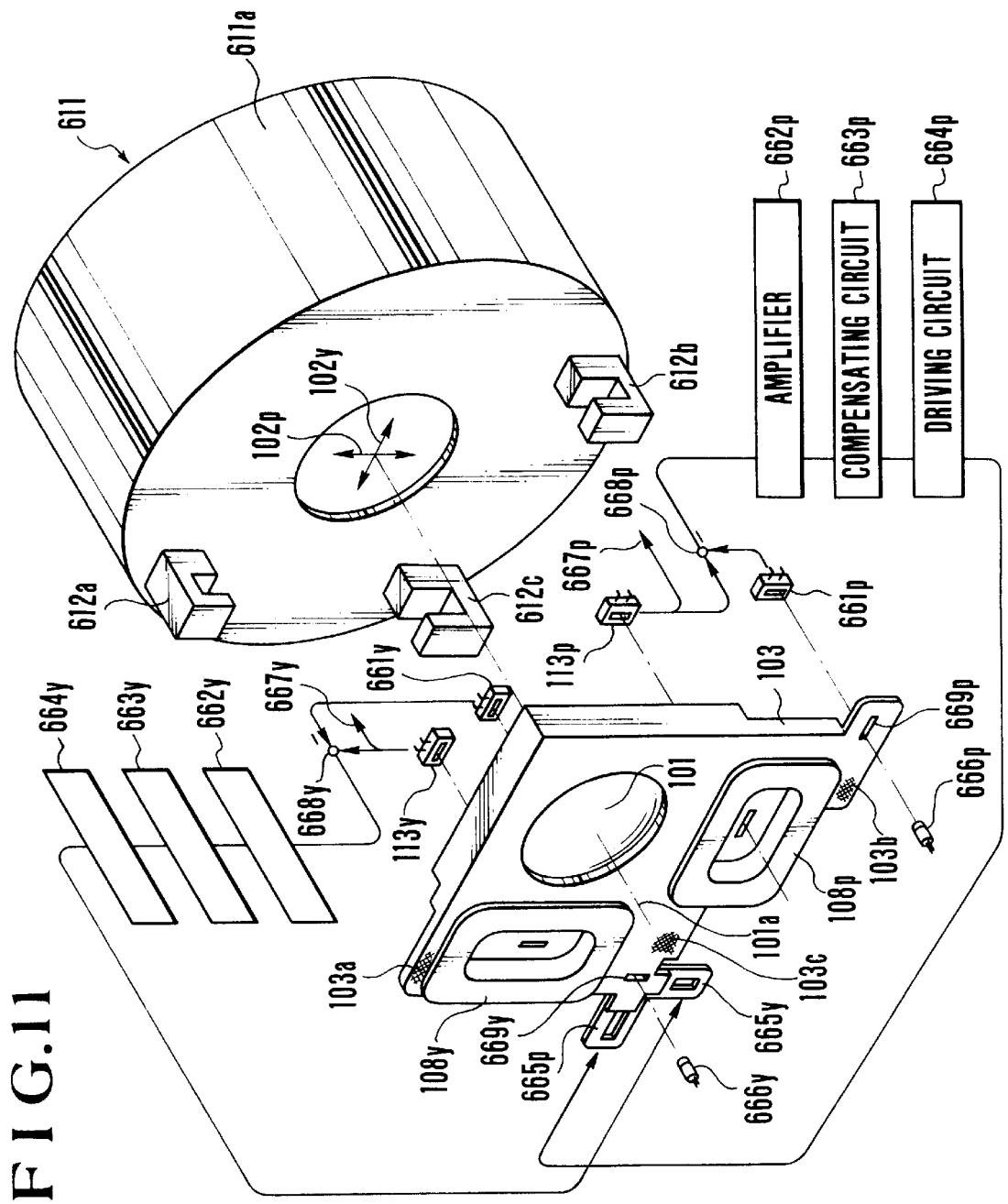
FIG. 11 is a perspective view showing the arrangement of the essential parts of an image stabilizing device according to an eighth embodiment of the present invention.

FIG. 11 is a perspective view showing the arrangement of the essential parts of an eighth embodiment of the present invention. The shown eighth embodiment uses rotation limiting means having an arrangement different from that of the rotation limiting means of the seventh embodiment described above.

The fixing frame 103 is provided with a second pitch slit 669p, a second yaw slit 669y, a second pitch coil 665p and a second yaw coil 665y. The position of the second pitch slit 669p and the position of the second yaw slit 669y are respectively detected by second pitch and yaw light emitters 666p, 666y and second light receivers 661p, 661y. The difference between the output of the second light receiver 661p (which is set in such a manner that its sensitivity is the same as that of the first light receiver 113p) and the output of the first light receiver 113p is obtained (by an adder circuit 668p). Similarly, the difference between the output of the second light receiver 661y (which is set in such a manner that its sensitivity is the same as that of the first light receiver 113y) and the output of the first light receiver 113y is obtained (by an adder circuit 668y). Accordingly, while the fixing frame 103 is moving in the pitch direction 102p and the yaw direction 102y, neither the difference output between the light receiver 113p and 661p or the difference output between the light receiver 113y and 661y is provided.

However, if the fixing frame 103 rotates about the optical axis 101a, each of the difference outputs is provided. Such light receivers 113p, 113y, 661p, 661y and difference outputting means (the adder circuits 668p, 668y) constitute rotation detecting means.

Figure 15:
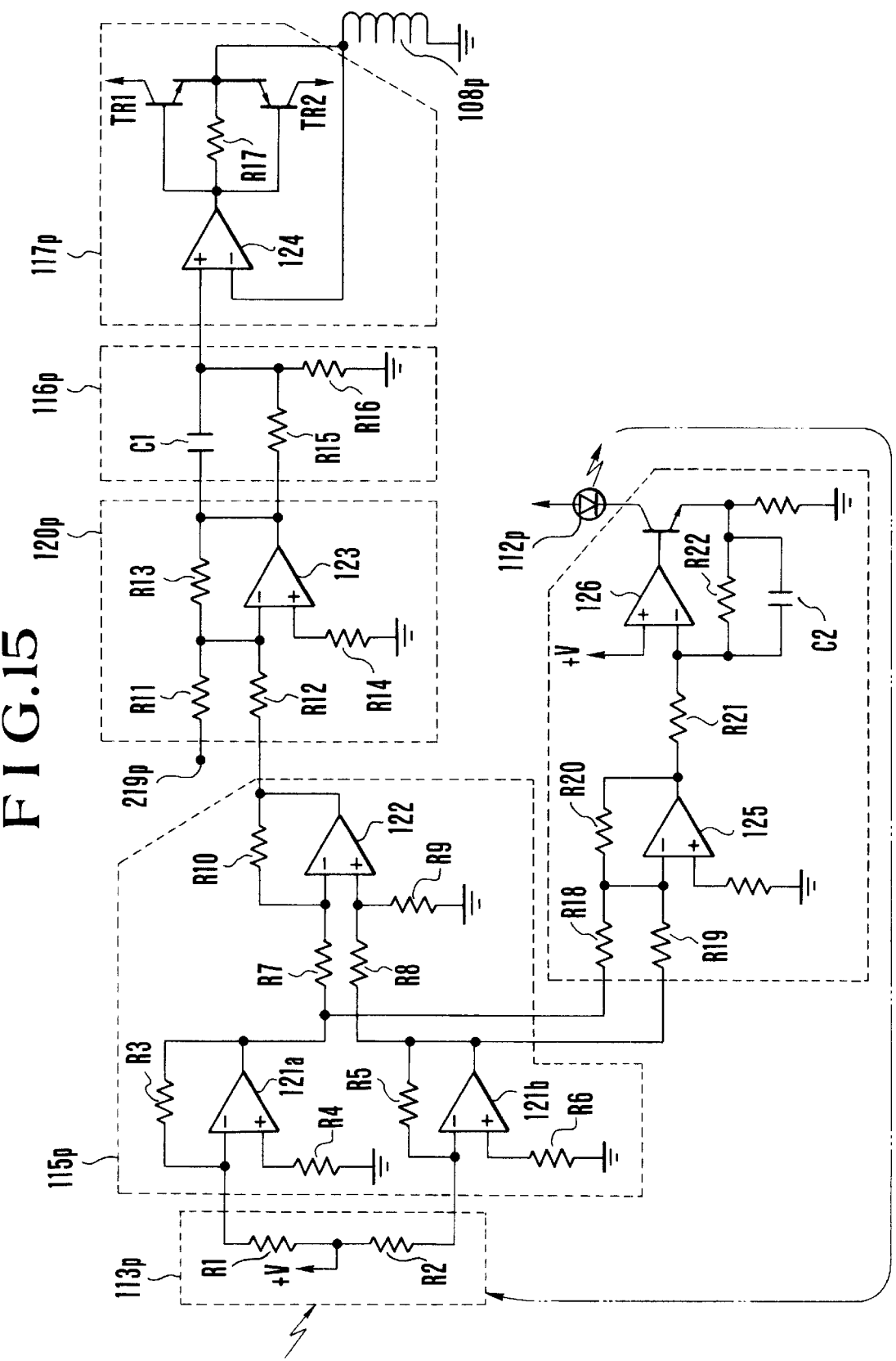
FIG. 15 is a circuit diagram concretely showing the electrical arrangement of the image stabilizing device shown in FIGS. 12 and 24.
Figure 16:
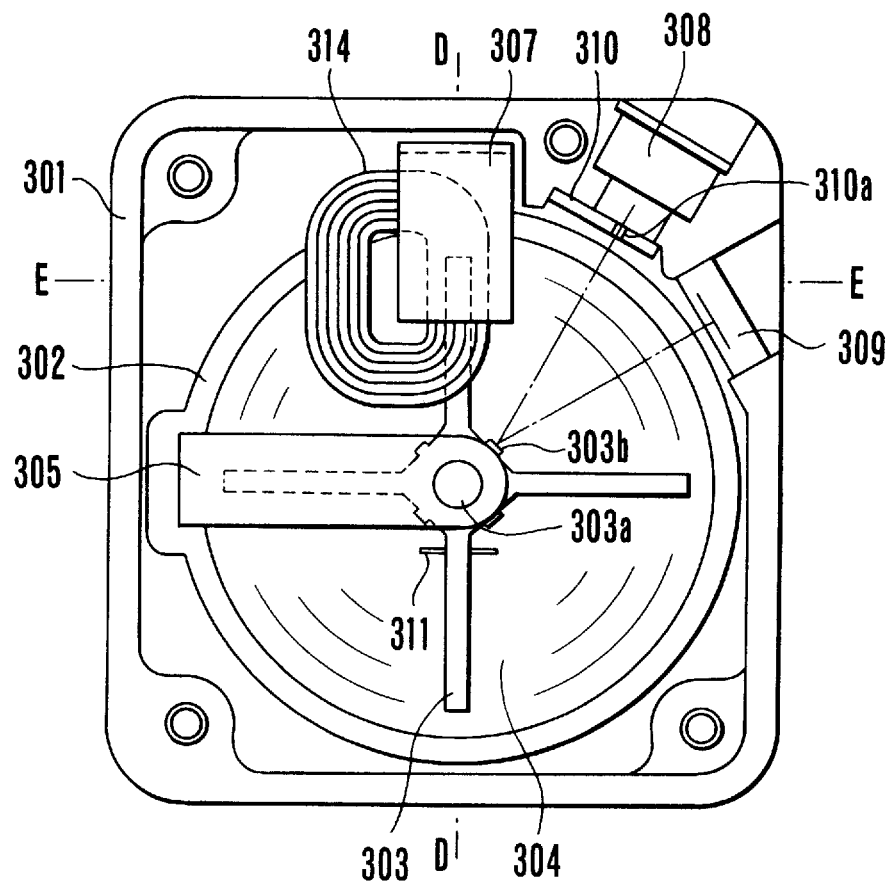
FIG. 16 is a schematic plan view showing an angular displacement detecting device which is one conventional type of vibration detecting means.
Figure 17:
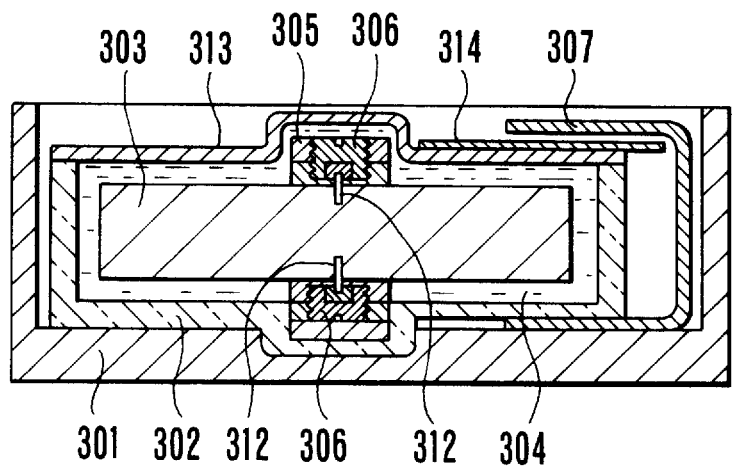
FIG. 17 is a cross-sectional view taken along line D—D of FIG. 16.
Figure 18:
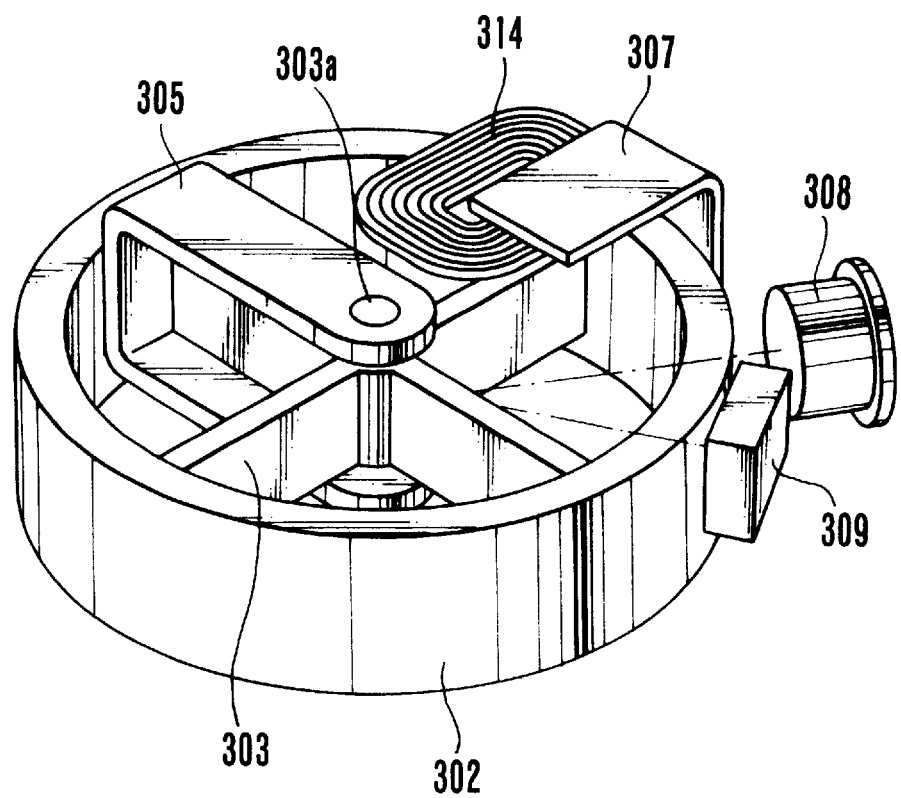
FIG. 18 is a perspective view showing the angular displacement detecting device shown in FIG. 16.
Figure 19:
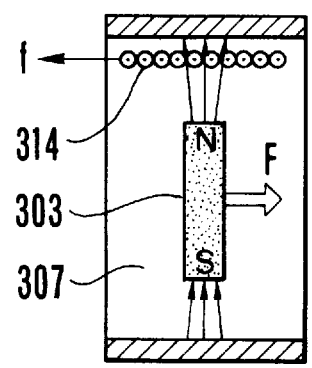
FIG. 19 is a cross-sectional view taken along line E—E of FIG. 16.
Figure 20:
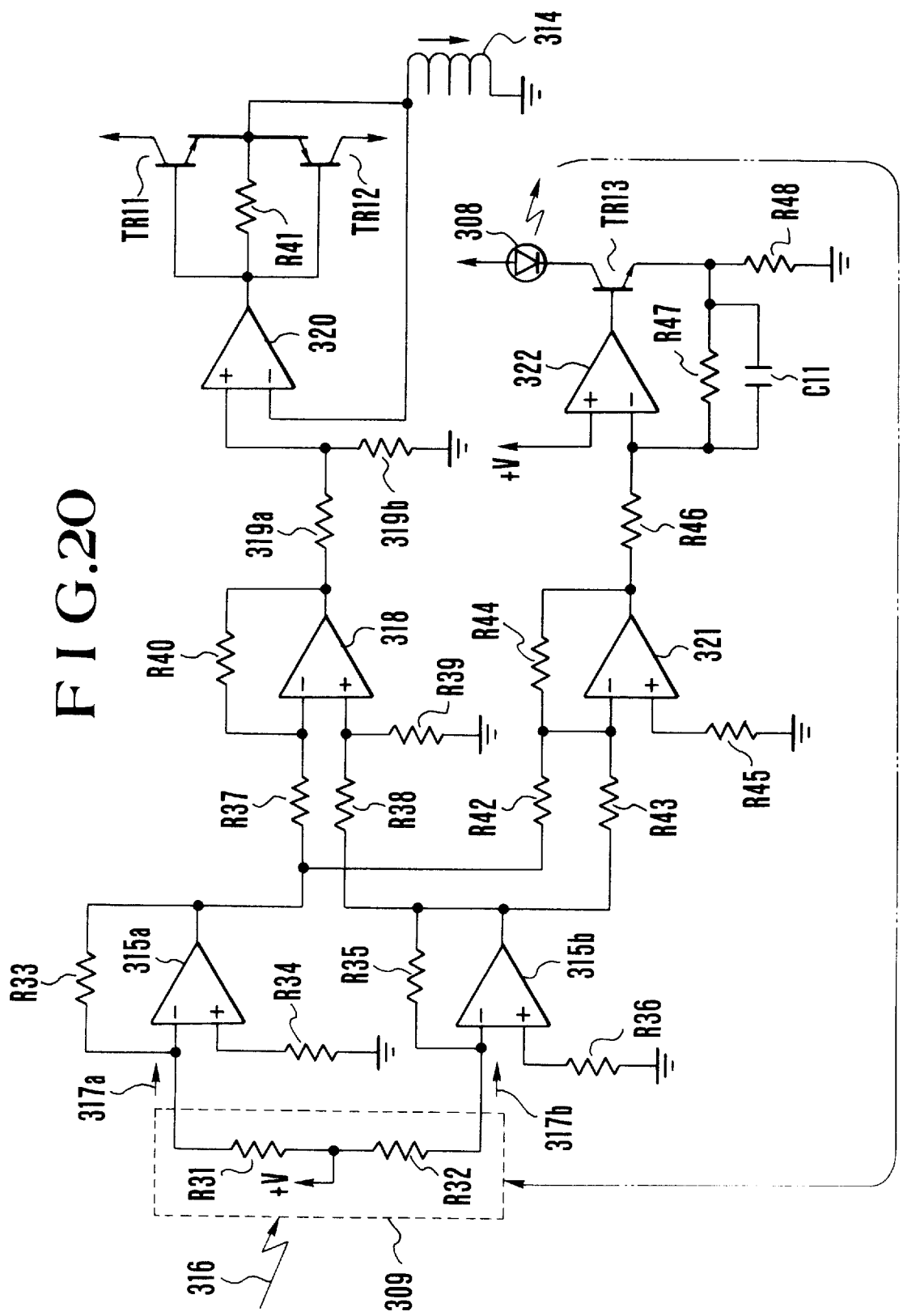
FIG. 20 is a circuit diagram showing the electrical arrangement of the angular displacement detecting device shown in FIG. 16.
Figure 21:
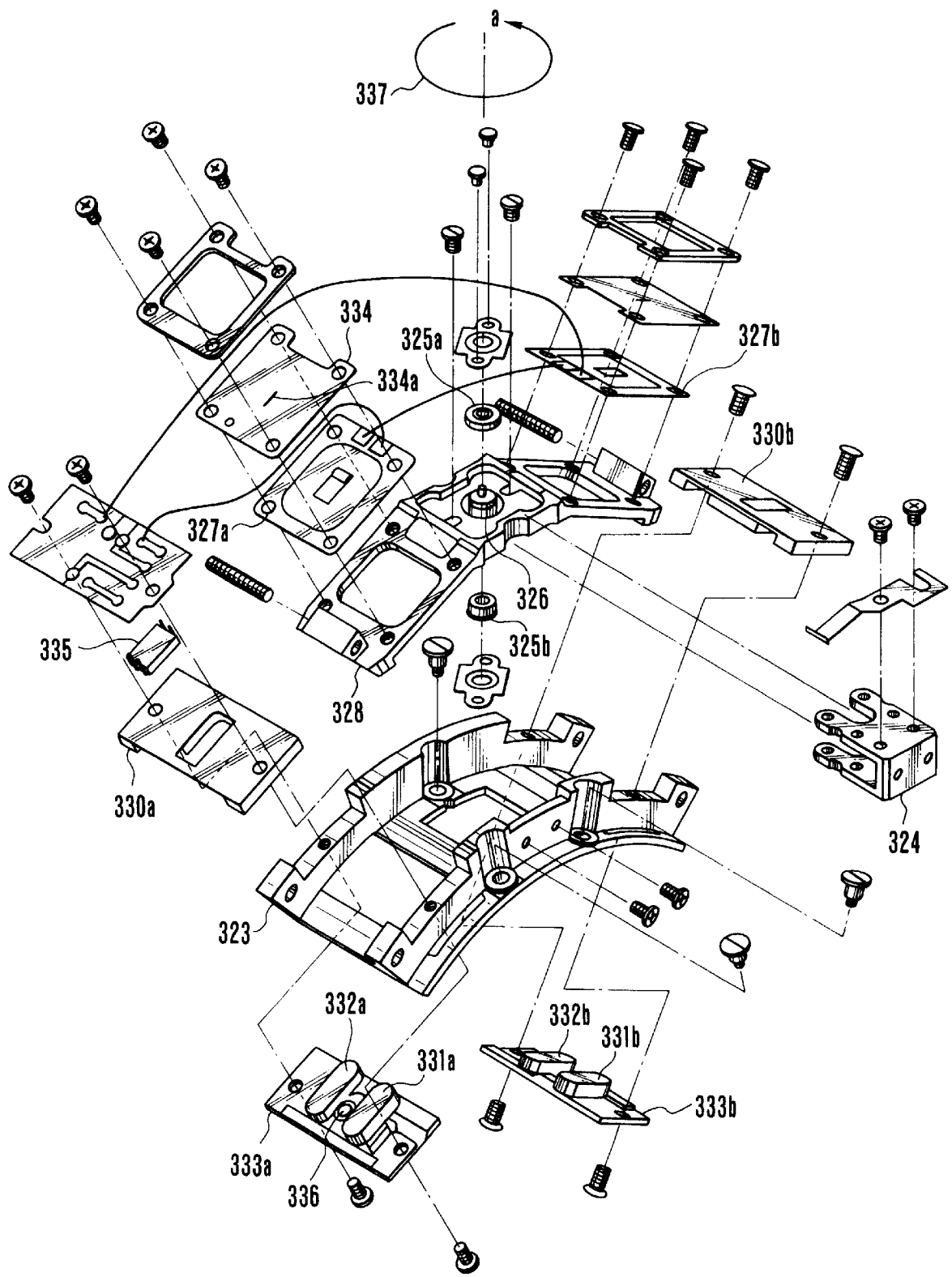
FIG. 21 is an exploded perspective view showing the arrangement of a servo angular accelerometer which is one conventional type of vibration detecting means.
Figure 22:
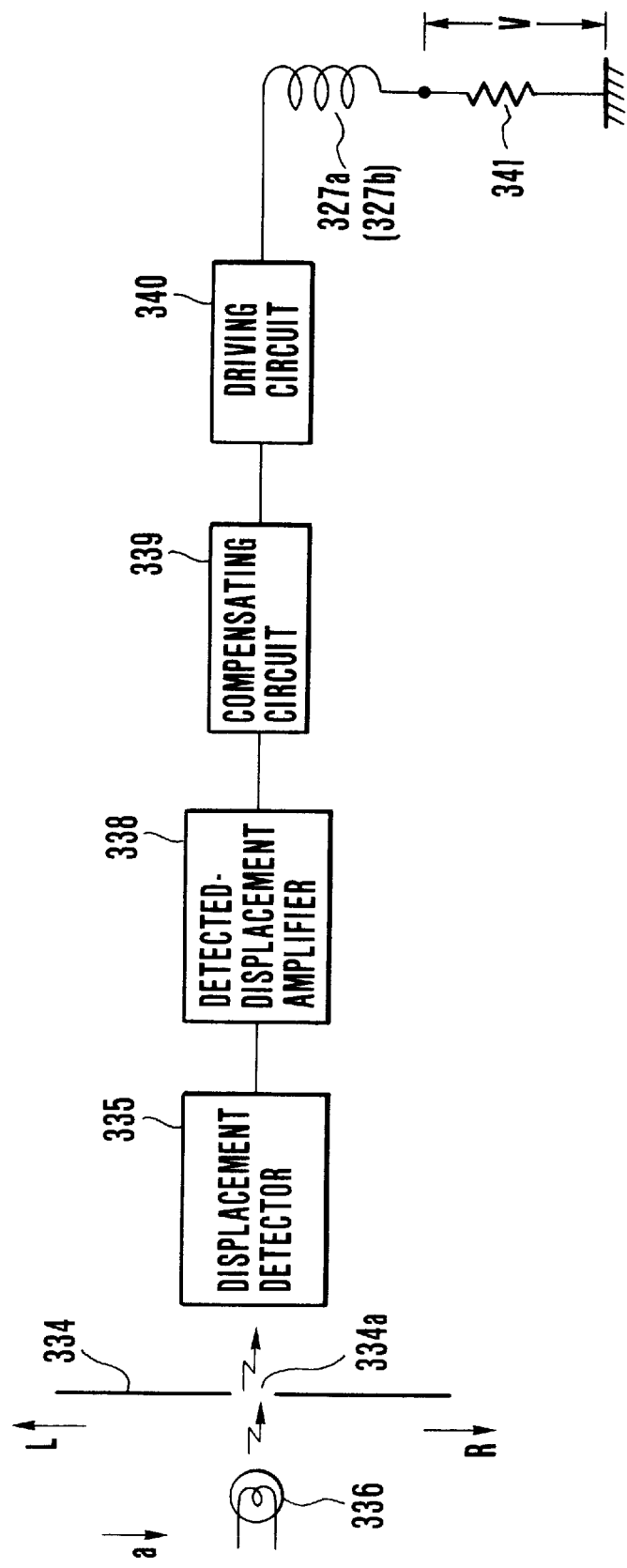
FIG. 22 is a block diagram showing the electrical arrangement of the servo angular accelerometer shown in FIG. 21.
Figure 23:
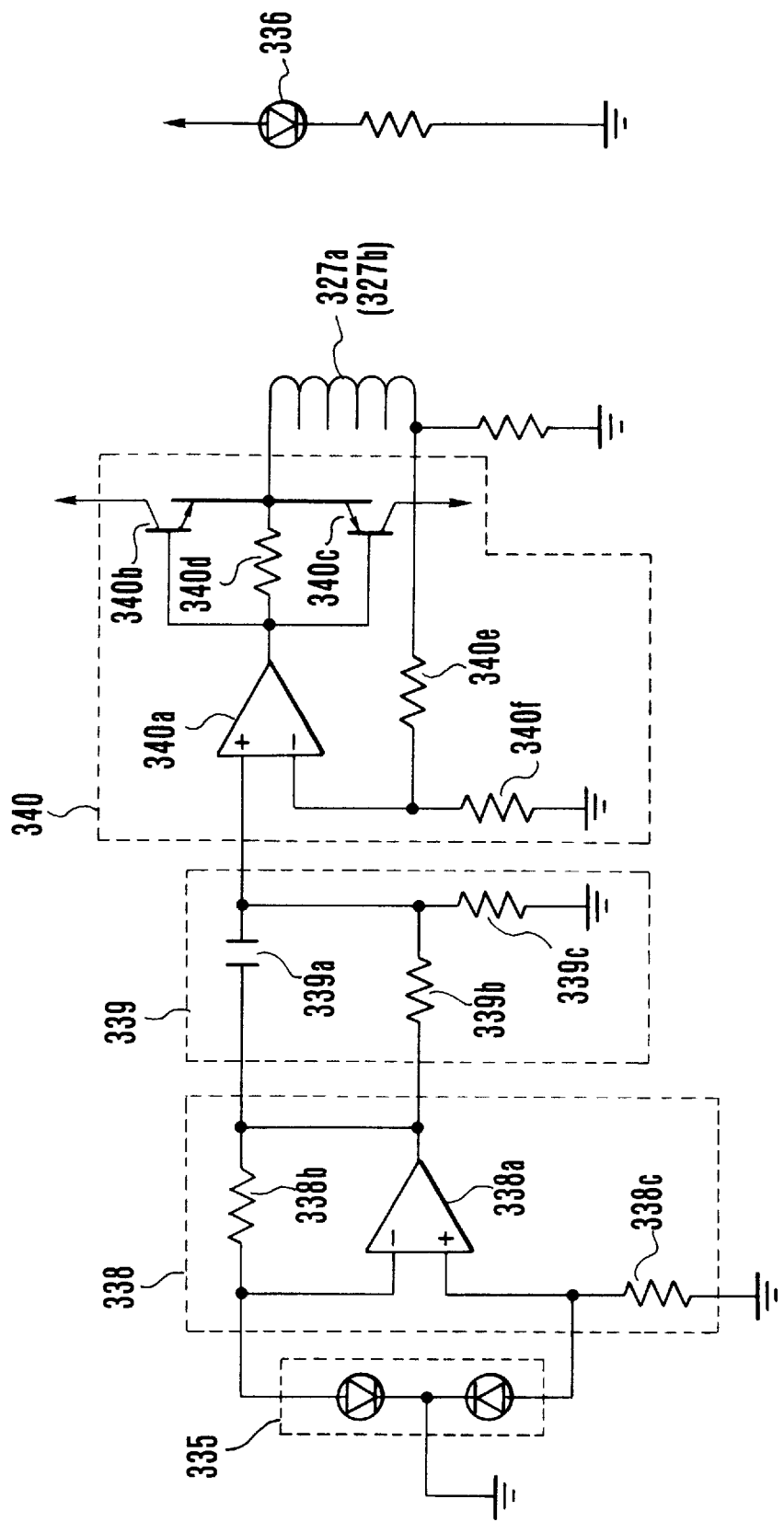
FIG. 23 is a circuit diagram concretely showing the electrical arrangement shown in FIG. 22.

The respective difference outputs pass through amplifiers 662p, 662y, compensating circuits 663p, 663y and driving circuits 664p, 664y, whereby the second pitch and yaw coils 665p and 665y are individually driven. This arrangement is substantially identical to the arrangement described previously in connection with FIGS. 15 and 24. Since the driving direction of each of the second pitch and yaw coils 665p and 665y do not pass through the center of gravity of the correcting optical mechanism, if each of the second pitch and yaw coils 665p and 665y is driven, the correcting optical mechanism is subjected to a rotational force about the optical axis 101a.

In other words, the second pitch and yaw coils 665p and 665y constitute rotation driving means. The wirings of the second pitch and yaw coils 665p and 665y and the polarities of associated magnets (not shown) are set so that the rotational force by the rotation driving means is applied in the direction opposite to the rotational direction detected from the difference output between the light receivers 661p and 113p and the difference output between the light receivers 661y and 113y. The rotation of the correcting optical mechanism about the optical axis 101a is limited by the driving force produced by the second pitch and yaw coils 665p and 665y.

According to the above-described arrangement, since no mechanical rotation limiting means, such as that used in each of the first to seventh embodiments, is incorporated, it is possible to reduce friction occurring in the correcting optical mechanism and realize smooth driving.

In the arrangement shown in FIG. 11, the outputs of the first pitch and yaw light receivers 113p and 113y respectively branch in the directions of arrows 667p and 667y before the difference outputs relative to the second pitch and yaw light receivers 661p and 661y are obtained. The branch outputs are inputted to the conventional circuit shown in FIGS. 15 and 24, so that the driving of the correcting optical mechanism in the pitch direction 102p and the yaw direction 102y is performed.

(Ninth Embodiment)

Figure 12:
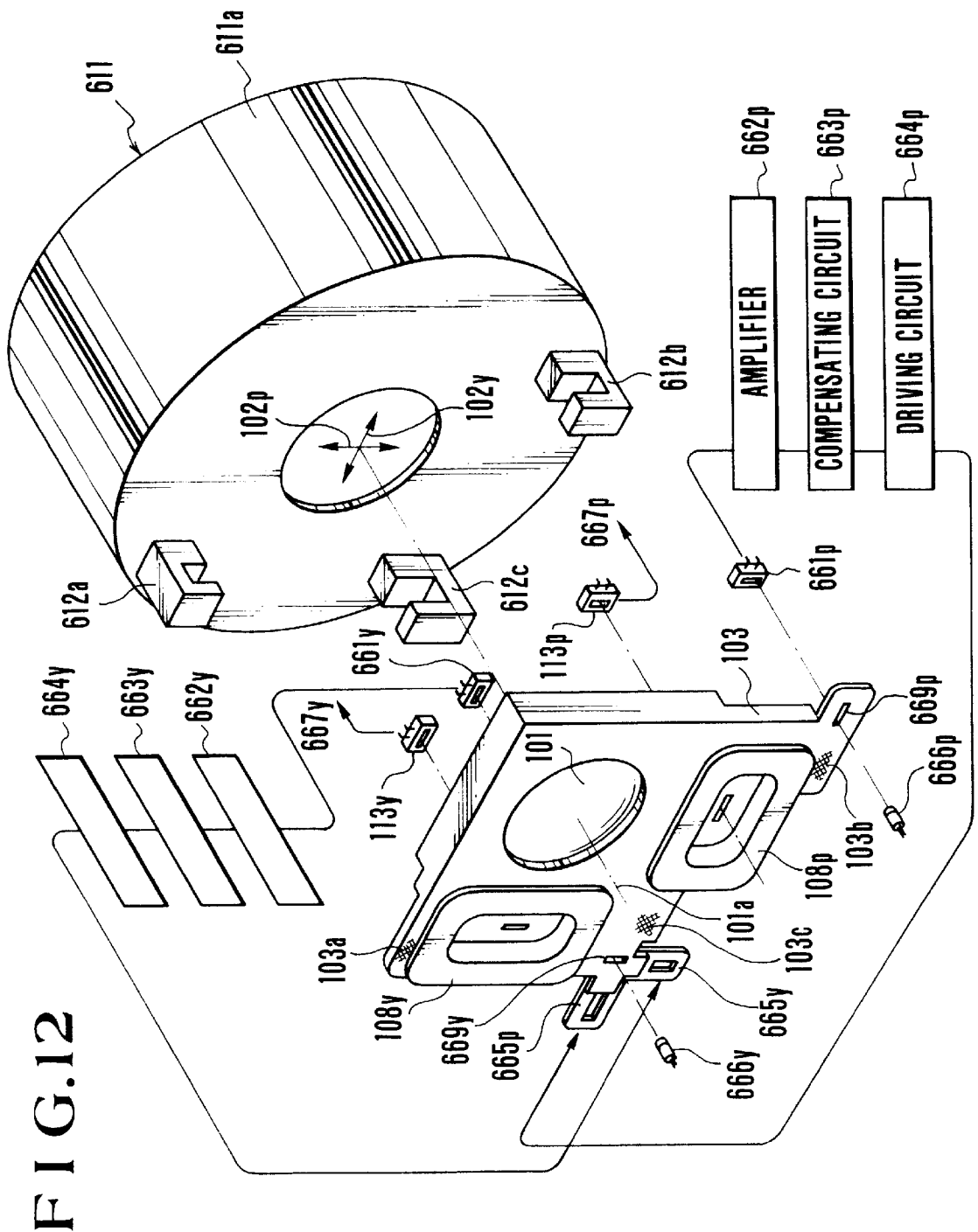
FIG. 12 is a perspective view showing the arrangement of the essential parts of an image stabilizing device according to a ninth embodiment of the present invention.
Figure 13:
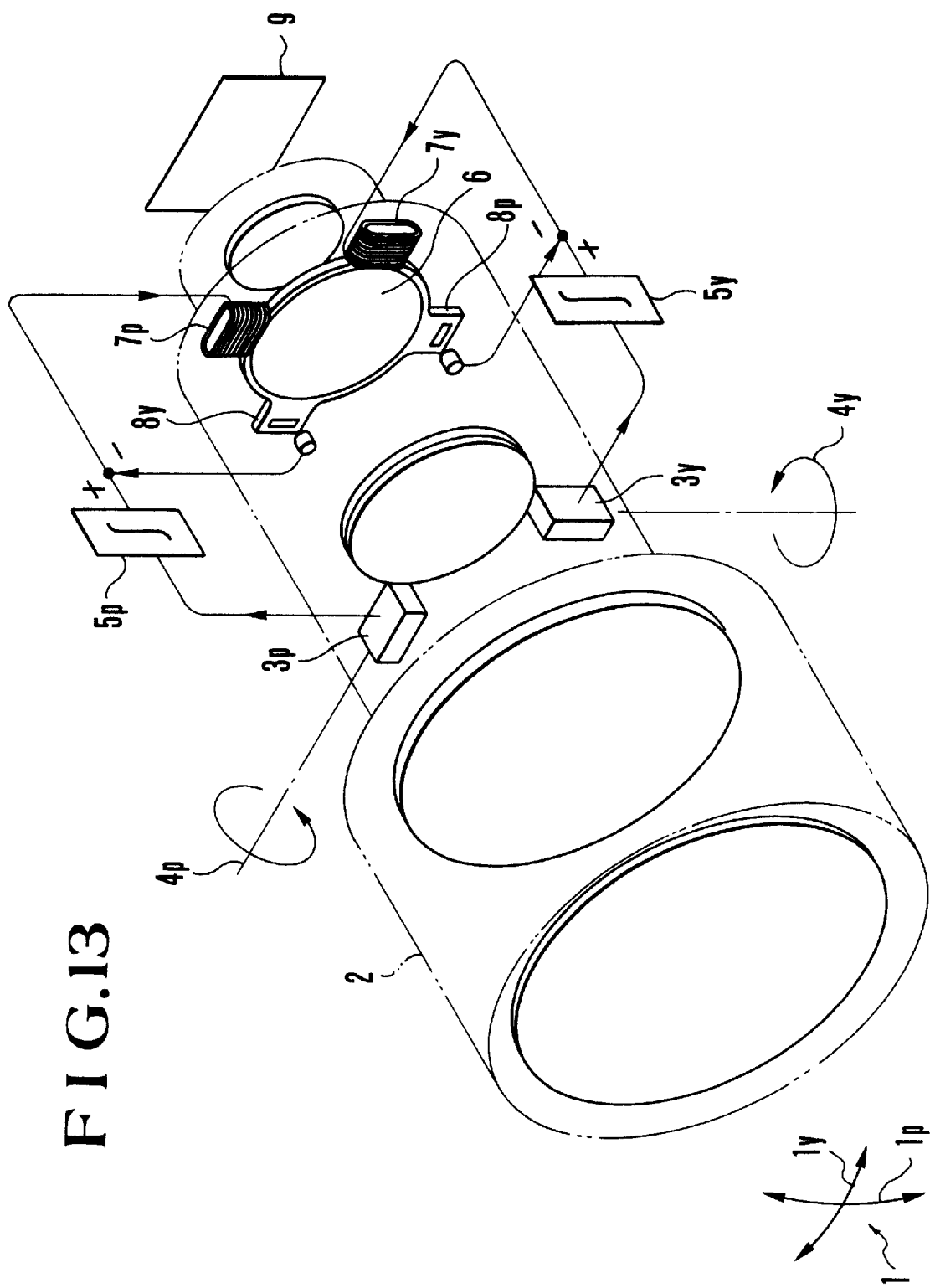
FIG. 13 is a perspective view schematically showing the arrangement of a camera of the image stabilization type in which such an image stabilizing device is incorporated.

FIG. 12 is a perspective view showing the arrangement of the essential parts of a ninth embodiment of the present invention. The ninth embodiment also uses rotation limiting means which is based on a concept similar to that of the eighth embodiment described above.

In the eighth embodiment shown in FIG. 11, when a rotation of the correcting optical mechanism about the optical axis 101a occurs, the rotation driving means is driven to suppress the rotation. In the ninth embodiment, as shown in FIG. 12, the second pitch and yaw coils 665p and 665y are driven on the basis of detection outputs provided by the second pitch and yaw light receivers 661p and 661y in a manner similar to the control described above in connection with FIGS. 15 and 24.

During the driving, the thrust directions of the pitch coils 108$p$ and 665$p$ and the thrust directions of the yaw coils 108$y$ and 665$y$ coincide with each other, respectively, but their respective thrust central axes do not coincide with each other (i.e., the thrust central axes of the second pitch and yaw coils 665$p$ and 665$y$ are greatly distant from the center of gravity of the correcting optical mechanism). Accordingly, the correcting optical mechanism is driven at two distant locations in the same direction, and the light receivers 113$p$ and 661$p$ and the light receivers 113$y$ and 661$y$ are set to the same sensitivities, respectively. Therefore, the rotation of the correcting optical mechanism about the optical axis 101$a$ does not occur.

As described above, the rotation limiting means may also be realized by providing driving control relative to the same direction at two locations for different thrust axes.

According to each of the above-described third to ninth embodiments, the correcting optical mechanism is clamped between at least three supporting points directly provided on the supporting frame supported by a lens barrel (not shown) and members (the projections 103$a$, 103$b$ and 103$c$) opposed to the respective supporting points, and no intermediate members which would have heretofore been necessary are interposed between the three supporting points and the supporting frame. Accordingly, no dimensional tolerance accumulates and it is possible to hold the correcting lens in a plane perpendicular to the optical axis with high precision, whereby it is possible to prevent deterioration of the optical characteristics of the photographic optical system.

If the plane determined by the pitch and yaw shafts is not parallel to the plane determined by the three supporting points, the fixing frame is unable to move smoothly in the pitch direction or the yaw direction. For this reason, the pitch and yaw slide shafts are engaged with the respective slide bearings by means of slots or the like. Accordingly, the plane of the correcting optical mechanism is not determined by the pitch and yaw slide shafts, and the pitch and yaw slide shafts serve to limit only the rotation of the correcting optical mechanism about the optical axis, so that it is possible to hold the correcting lens in a plane perpendicular to the optical axis with high precision.

In each of the above-described third to ninth embodiments, the three supporting points are directly provided on the supporting frame supported by a lens barrel, but they may also be directly provided on the lens barrel. Although the embodiments have been described with reference to the correcting optical mechanism for a camera, the range of applications of the present invention is not limited to a camera. The present invention is applicable to, for example, various other optical apparatus such as video cameras.

As is apparent from the foregoing description, according to each of the above-described third to ninth embodiments, the three supporting points for supporting the fixing frame (the correcting lens) are directly provided on a lens barrel of a camera or the supporting frame supported by the lens barrel, and no intermediate members are interposed therebetween (between the supporting points and the supporting frame) so that no dimensional tolerance accumulates. Accordingly, it is possible to obtain desired optical characteristics by moving the correcting lens in a plane perpendicular to the optical axis.

What is claimed is:

1. An image stabilizing device comprising:

image-shake correcting optical means for performing an image-shake prevention operation for deflecting a flux of passing light rays by moving in a plane perpendicular to or approximately perpendicular to an optical axis of an optical system;

connecting means for connecting said image-shake correcting optical means and the optical system; and adjustment means for performing an adjustment operation for adjusting a relative inclination of an optical axis of said image-shake correcting optical means with respect to the optical axis of the optical system, wherein said adjustment means performs the adjustment operation independently of the image-shake prevention operation;

a holding member being integral with said image-shake correcting optical means and having a projection; and a supporting member for supporting the projection of said holding member at least three supporting points in such a manner that the projection of said holding member is displaceable in a plane perpendicular to or approximately perpendicular to the optical axis of said optical system.

2. An image stabilizing device according to claim 1, wherein said connecting means includes supporting means for supporting said image-shake correcting optical means in such a manner that said image-shake correcting optical means is movable in said plane.

3. An image stabilizing device according to claim 2, wherein said adjustment means adjusts a relative inclination between said image-shake correcting optical means and said supporting means.

4. An image stabilizing device according to claim 3, wherein said adjustment means includes a groove portion provided in said supporting means and a position-adjustable member provided on a member integral with said image-shake correcting optical means and brought into engagement with said groove portion in a positionally adjustable state.

5. An image stabilizing device according to claim 4, wherein said position-adjustable member is an eccentric shaft.

6. An image stabilizing device according to claim 2, wherein said supporting means supports said image-shake correcting optical means in such a manner that said image-shake correcting optical means is displaceable in said plane in at least two directions.

7. An image stabilizing device according to claim 6, wherein said supporting means includes a first supporting member for supporting said image-shake correcting optical means in such a manner that said image-shake correcting optical means is displaceable in a first direction in said plane.

8. An image stabilizing device according to claim 7, wherein said supporting means includes a second supporting member for supporting said image-shake correcting optical means and said first supporting member in such a manner that said image-shake correcting optical means and said first supporting member are displaceable in a second direction in said plane.

9. An image stabilizing device according to claim 8, wherein said adjustment means adjusts a relative inclination between said image-shake correcting optical means and said first supporting member.

10. An image stabilizing device according to claim 9, wherein said adjustment means includes a groove portion provided in said first supporting member and an eccentric shaft provided on a member integral with said image-shake correcting optical means and brought into engagement with said groove portion at its one end.

11. An image stabilizing device according to claim 8, wherein said adjustment means adjusts a relative inclination between said first supporting member and said second supporting member.

12. An image stabilizing device according to claim 11, wherein said adjustment means includes a groove portion provided in said first supporting member and an eccentric shaft provided on a member integral with said image-shake correcting optical means and brought into engagement with said groove portion at its one end.

13. An image stabilizing device according to claim 2, wherein said adjustment means is means for adjusting an inclination of said image-shake correcting optical means and said supporting means with respect to the optical axis of said optical system.

14. An image stabilizing device according to claim 13, wherein said adjustment means is an eccentric shaft for holding said supporting member on a lens-barrel member.

15. An image stabilizing device according to claim 1, wherein said adjustment means is means for adjusting the optical axis of said image-shake correcting optical means and the optical axis of said optical system to be made parallel or approximately parallel to each other.

16. An image stabilizing device according to claim 1, further comprising a pressure applying member for applying pressure to said image-shake correcting optical means and to said holding member in the direction of the optical axis of said optical system.

17. An image stabilizing device according to claim 16, wherein said pressure applying member is provided on said holding member.

18. An image stabilizing device according to claim 16, wherein said pressure applying member is provided on said supporting member.

19. An image stabilizing device according to claim 1, further comprising rotation limiting means for limiting a rotation of said image-shake correcting optical means about the optical axis thereof.

20. An image stabilizing device according to claim 19, wherein said rotation limiting means includes means for supporting said image-shake correcting optical means in such a manner that said image-shake correcting optical means is displaceable in two directions in a plane perpendicular to or approximately perpendicular to the optical axis of said optical system.

21. An image stabilizing device according to claim 19, wherein said rotation limiting means includes rotational displacement detecting means for detecting a rotational displacement of said image-shake correcting optical means about the optical axis of said optical system and rotation driving means for rotationally driving said image-shake correcting optical means in accordance with an output of said rotational displacement detecting means.

22. An image stabilizing device according to claim 21, wherein said rotation limiting means is formed by a plurality of driving members having thrust axes different from each other and thrust directions coincident with each other.

23. A light deflecting device comprising:
light deflecting means for performing a light deflection operation for deflecting a flux of passing light rays by moving in a plane perpendicular to or approximately perpendicular to an optical axis of an optical system;
connecting means for connecting said light deflecting means and the optical system; and
adjustment means for performing an adjustment operation for adjusting a relative inclination of an optical axis of said light deflecting means with respect to the optical axis of said optical system,
wherein said adjustment means performs the adjustment operation independently of the light deflection operation.

24. A light deflecting device according to claim 23, wherein said adjusting means includes a groove portion provided in a member for supporting said light deflecting means and an eccentric shaft brought into engagement with said groove portion at its one end.

25. A light deflecting device according to claim 23, wherein said connecting means includes supporting means for supporting said light deflecting means in such a manner that said light deflecting means is movable in said plane.

26. An image-shake preventing apparatus for image stabilizing, comprising:
connecting means for connecting an image forming optical system and a movable member which moves in a first manner for preventing an image-shake of an image formed by the image forming optical system; and
adjustment means for adjusting a relationship between the image forming optical system and the movable member by moving the movable member in a manner different from the first manner.

27. An apparatus according to claim 26, wherein the apparatus includes the movable member.

28. An apparatus according to claim 26, wherein said connecting means includes arranging means for arranging the movable member such that the image forming optical system moves in an optical path of light used for forming the image.

29. An apparatus according to claim 26, wherein the movable member includes an optical member.

30. An apparatus according to claim 26, wherein the movable member includes preventing means for preventing image-shake by moving in a first direction, and said adjustment means includes displacing means for performing the adjustment by displacing the movable member in a direction different from the first direction.

31. An apparatus according to claim 26, wherein the movable member includes preventing means for preventing image-shake by movement in a direction substantially perpendicular to an optical axis of the image forming optical system, and said adjustment means includes displacing means for adjusting an inclination of the movable member relative to the optical axis.

32. An optical apparatus, comprising:
connecting means for connecting an image forming optical system for image formation and a movable member which moves in a first manner for preventing an image-shake of an image formed by the image forming optical system; and
adjustment means for adjusting a relationship between the image forming optical system and the movable member by moving the movable member in a manner different from the first manner.

33. A camera, comprising:
connecting means for connecting an image forming optical system for image formation and a movable member which moves in a first manner for preventing an image-shake of an image formed by the image forming optical system; and
adjustment means for adjusting a relationship between the image forming optical system and the movable member by moving the movable member in a manner different from the first manner.

34. An image-shake preventing apparatus for image stabilizing, comprising:

connecting means for connecting an image forming optical system for image formation and a movable member of an image-shake preventing portion, which moves for preventing an image-shake of an image formed by the image forming optical system; and adjustment means for adjusting a relationship between the image forming optical system and the image-shake preventing portion when the image-shake preventing apparatus is constructed.

35. An apparatus according to claim 34, wherein the apparatus includes the movable member.

36. An apparatus according to claim 34, wherein said connecting means includes arranging means for arranging the movable member such that the image forming optical system moves in an optical path of light used for forming the image.

37. An apparatus according to claim 34, wherein the movable member includes an optical member.

38. An apparatus according to claim 34, wherein the movable member includes preventing means for preventing image-shake by moving in a predetermined direction, and said adjustment means includes displacing means for performing the adjustment by displacing the movable member in a direction different from the predetermined direction.

39. An apparatus according to claim 34, wherein the movable member includes preventing means for preventing image-shake by movement in a direction substantially perpendicular to an optical axis of the image forming optical system, and said adjustment means includes displacing means for adjusting an inclination of the movable member relative to the optical axis.

40. An apparatus according to claim 34, wherein said adjustment means includes mechanical means for performing the adjustment mechanically.

41. An optical apparatus, comprising:

connecting means for connecting an image forming optical system and a movable member of an image-shake preventing portion, which moves for preventing an image-shake of an image formed by the image forming optical system; and adjustment means for adjusting a relationship between the image forming optical system and the image-shake preventing portion when the optical apparatus is constructed.

42. A camera, comprising:

connecting means for connecting an image forming optical system for image formation and a movable member of an image-shake preventing portion, which moves for preventing an image-shake of an image formed by the image forming optical system; and adjustment means for adjusting a relationship between the image forming optical system and the image-shake preventing portion when the camera is constructed.

43. An apparatus for light deflection, comprising:

connecting means for intersecting a light deflection portion for deflecting a flux of passing light rays with an optical path by moving the light deflection portion in a first manner; and adjustment means for adjusting a relationship between the optical path and the light deflection portion by moving the light deflection portion in a manner different from the first manner.

44. An apparatus according to claim 43, wherein said connecting means includes an optical member.

45. An apparatus according to claim 43, wherein said connecting means includes preventing means for preventing image-shake by moving in a predetermined direction, and said adjustment means includes displacing means for performing the adjustment by displacing a movable member in a direction different from the first direction.

46. An apparatus for light deflection, comprising:

connecting means for intersecting a light deflection portion for deflecting a flux of passing light rays with an optical path by moving the light deflection portion relative to the optical path; and adjustment means for adjusting a relationship between the optical path and the light deflection portion when the apparatus is constructed, wherein the relationship adjusted by the adjustment means is maintained in a fixed state after construction of the apparatus.

47. An apparatus according to claim 46, wherein said connecting means includes an optical member.

48. An apparatus according to claim 46, wherein said connecting means includes preventing means for preventing image-shake by moving in a predetermined direction, and said adjustment means includes moving means for performing the adjustment by moving a movable member in a direction different from the first direction.

* * * * *

UNITED STATES PATENT AND TRADEMARK OFFICE
CERTIFICATE OF CORRECTION

PATENT NO. : 5,774,266
DATED : June 30, 1998
INVENTOR(S) : TADASU OTANI, ET AL.

It is certified that error appears in the above-identified patent and that said Letters Patent is hereby corrected as shown below:

Title page,
<u>At [75] Inventors</u>

"Kanagawa-ken;" should read --Yokohama;--.

<u>Column 1</u>

Line 21, "operation s" should read --operations--.

<u>Column 6</u>

Line 25, "an" should read --a--.

<u>Column 8</u>

Line 32, "t he" should read --the--.

<u>Column 11</u>

Line 62, "invention; and" should read --invention, and--.
Line 63, "FIG. 6A" should read --FIG. 6A;--.

UNITED STATES PATENT AND TRADEMARK OFFICE
CERTIFICATE OF CORRECTION

PATENT NO. : 5,774,266
DATED : June 30, 1998
INVENTOR(S) : TADASU OTANI, ET AL.

It is certified that error appears in the above-identified patent and that said Letters Patent is hereby corrected as shown below:

Column 13

Line 37, "shaft 401pis" should read --401p is--.

Column 16

Line 47, "shows" should read --show--.

Column 19

Line 4, "applying" should read --apply--.

Column 22

Line 9, "system; and" should read --system;--.

Signed and Sealed this

Sixth Day of April, 1999

Attest:

Attesting Officer

Q. TODD DICKINSON

Acting Commissioner of Patents and Trademarks